United States Patent
Cheng et al.

(10) Patent No.: US 11,310,323 B2
(45) Date of Patent: Apr. 19, 2022

(54) MESSAGE PROCESSING METHOD, APPARATUS, AND SYSTEM

(71) Applicant: Huawei Technologies Co., Ltd., Shenzhen (CN)

(72) Inventors: Yiping Cheng, Shanghai (CN); Caixia Qi, Shanghai (CN); Jing Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/119,100

(22) Filed: Dec. 11, 2020

(65) Prior Publication Data
US 2021/0099527 A1     Apr. 1, 2021

Related U.S. Application Data

(63) Continuation of application No. PCT/CN2019/098629, filed on Jul. 31, 2019.

(30) Foreign Application Priority Data

Aug. 14, 2018 (CN) .......................... 201810924407.1

(51) Int. Cl.
*G06F 15/16*     (2006.01)
*H04L 67/141*     (2022.01)
(Continued)

(52) U.S. Cl.
CPC ............ *H04L 67/141* (2013.01); *H04L 67/02* (2013.01); *H04L 69/328* (2013.01); *H04L 69/163* (2013.01)

(58) Field of Classification Search
CPC ..... H04L 67/141; H04L 69/328; H04L 67/02; H04L 69/163; H04L 67/2842; H04L 29/08
See application file for complete search history.

(56) References Cited

U.S. PATENT DOCUMENTS

| | | | | |
|---|---|---|---|---|
| 7,529,840 B2 * | 5/2009 | Bocq | ...................... | H04L 67/14 709/217 |
| 10,225,151 B2 * | 3/2019 | Zhou | ...................... | H04L 12/14 |

(Continued)

FOREIGN PATENT DOCUMENTS

| | | |
|---|---|---|
| CN | 1838669 A | 9/2006 |
| CN | 101640602 A | 2/2010 |

(Continued)

OTHER PUBLICATIONS

Belshe, M. et al., "Hypertext Transfer Protocol Version 2 (HTTP/2)", Internet Engineering Task Force (IETF), Standards Track, RFC 5741, Mozilla, May 2015, 96 pages.

*Primary Examiner* — Cheikh T Ndiaye
(74) *Attorney, Agent, or Firm* — Slater Matsil, LLP

(57) ABSTRACT

This application provides a message processing method, an apparatus, and a system. The method includes: establishing a first HTTP interaction procedure between a first network element and a second network element; sending, by the first network element, a first request message to the second network element in the first HTTP interaction procedure; before the first network element receives a first response message for the first request message in the first HTTP interaction procedure, initiating, by the second network element, establishment of a second HTTP interaction procedure between the first network element and the second network element; and receiving, by the first network element, a second request message sent by the second network element. The first network element performs an operation on the second request message based on a relationship between the first HTTP interaction procedure and the second HTTP interaction procedure.

20 Claims, 12 Drawing Sheets

(51) Int. Cl.
*H04L 67/02* (2022.01)
*H04L 69/328* (2022.01)
*H04L 69/163* (2022.01)

(56) References Cited

U.S. PATENT DOCUMENTS

2012/0124219 A1* 5/2012 Zhu .................. H04L 69/163
709/227
2019/0261260 A1* 8/2019 Dao .................. H04W 48/18

FOREIGN PATENT DOCUMENTS

| CN | 105577605 A | 5/2016 |
| CN | 106375453 A | 2/2017 |
| EP | 3171542 A1 | 5/2017 |
| WO | 2012064564 A1 | 5/2012 |
| WO | 2014173252 A1 | 10/2014 |
| WO | 2015142102 A1 | 9/2015 |

* cited by examiner

MESSAGE PROCESSING METHOD, APPARATUS, AND SYSTEM

CROSS-REFERENCE TO RELATED APPLICATIONS

This application is a continuation of International Application No. PCT/CN2019/098629, filed on Jul. 31, 2019, which claims priority to Chinese Patent Application No. 201810924407.1, filed on Aug. 14, 2018. The disclosures of the aforementioned applications are hereby incorporated by reference in their entireties.

TECHNICAL FIELD

This application relates to the field of mobile communications technologies, and in particular, to a message processing method, an apparatus, and a system.

BACKGROUND

A control plane of the 5th generation (5G) communication uses a serving architecture. The serving architecture includes a plurality of network function (NF) network elements. The NF network elements communicate through a serving interface, and one NF network element may enable a plurality of services to another NF network element by using one serving interface. When an NF network element serves as a provider of an NF service, the NF network element may be referred to as an NF service producer. When an NF network element serves as a user of an NF service, the NF network element may be referred to as an NF service consumer.

The serving interface uses hypertext transfer protocol (HTTP)/2 as an application layer transmission protocol and a transmission control protocol (TCP) as a link layer transmission protocol. An HTTP connection is established on a TCP connection.

All NF network elements may have producer or consumer roles of different NF services, and a service procedure between the NF network elements is completed by invoking a plurality of serving interfaces. Therefore, when a service procedure is performed, two NF network elements send HTTP request messages to each other to generate two independent HTTP interaction procedures. The two independent HTTP interaction procedures are performed on different TCP connections, which may lead to a case in which message interaction between the two NF network elements is out of order.

SUMMARY

This application provides a message processing method, an apparatus, and a system, to implement orderly message interaction between two NF network elements.

According to a first aspect, this application provides a message processing method. The method includes: A first network element sends a first request message to a second network element. The first request message belongs to a first HTTP interaction procedure. Before receiving a first response message for the first request message, the first network element receives a second request message from the second network element. The first response message belongs to the first HTTP interaction procedure, and the second request message belongs to a second HTTP interaction procedure. The first network element performs an operation on the second request message based on a relationship between the first HTTP interaction procedure and the second HTTP interaction procedure. Based on this solution, the first HTTP interaction procedure is established between the first network element and the second network element. The first network element sends the first request message to the second network element in the first HTTP interaction procedure, and before the first network element receives the first response message for the first request message in the first HTTP interaction procedure, the second network element initiates establishment of the second HTTP interaction procedure between the first network element and the second network element, and the first network element receives the second request message sent by the second network element. In this case, if the second request message is directly processed, the second request message may be processed at incorrect time. Therefore, the first network element performs an operation on the second request message based on the relationship between the first HTTP interaction procedure and the second HTTP interaction procedure, to avoid processing the second request message at incorrect time. In this way, orderly message interaction between the first network element and the second network element can be implemented.

The following provides different implementation methods for performing an operation on the second request message based on the relationship between the first HTTP interaction procedure and the second HTTP interaction procedure.

Implementation method 1: If the first network element determines that the first HTTP interaction procedure and the second HTTP interaction procedure are independent of each other, the first network element processes the second request message.

In the implementation method, because the first HTTP interaction procedure and the second HTTP interaction procedure are independent of each other, or in other words, there is no interdependence between the first HTTP interaction procedure and the second HTTP interaction procedure, after receiving the second request message, the first network element may process the second request message without waiting for receiving and processing the first response message in the first HTTP interaction procedure.

Further, in an implementation, after processing the second request message, the first network element may further send a second response message for the second request message to the second network element. Further, after the first network element sends the second response message, if the first network element receives the first response message from the second network element, the first network element processes the first response message. The second response message belongs to the second HTTP interaction procedure.

Further, in another implementation, after processing the second request message, if the first network element receives the first response message from the second network element, the first network element processes the first response message. Further, after processing the first response message, the first network element may send a second response message for the second request message to the second network element. The second response message belongs to the second HTTP interaction procedure.

Implementation method 2: If the first network element determines that the second HTTP interaction procedure depends on the first HTTP interaction procedure and the second request message cannot be rejected, the first network element buffers the second request message. After receiving and processing the first response message, the first network element processes the second request message.

In the implementation method, because the second HTTP interaction procedure depends on the first HTTP interaction procedure and the second request message cannot be rejected, the first network element may first buffer the second request message. After receiving and processing the first response message, the first network element obtains the buffered second request message, and then processes the second request message. That the second HTTP interaction procedure depends on the first HTTP interaction procedure may mean that when processing the second request message, the first network element depends on the first response message received by the first network element, and therefore, needs to first receive and process the first response message.

Further, after processing the second request message, the first network element may send a second response message for the second request message to the second network element. The second response message belongs to the second HTTP interaction procedure.

Implementation method 3: If the first network element determines that the second HTTP interaction procedure depends on the first HTTP interaction procedure and the second request message can be rejected, the first network element sends a reject message to the second network element.

In the implementation method, because the second HTTP interaction procedure depends on the first HTTP interaction procedure and the second request message can be rejected, the first network element may reject the second reject message, and send the reject message to the second network element. Subsequently, the second network element re-initiates a request message.

In an implementation, the reject message sent by the first network element to the second network element may include specified duration, and the specified duration is used to indicate the second network element to re-initiate a request message after the specified duration. The specified duration may also be understood as a timer. Further, after the first network element sends the reject message to the second network element, if the first network element receives the first response message from the second network element, the first network element processes the first response message. After the first network element processes the first response message, if the first network element receives a third request message sent by the second network element when the specified duration expires, the first network element processes the third request message. The third request message is a request message re-initiated for the second request message. Further, the first network element may send a third response message for the third request message to the second network element. The third response message belongs to the second HTTP interaction procedure. It should be noted that if the first network element has not received the first response message or processed the first response message when receiving the third request message, the first network element may send a reject message to the second network element again.

In another implementation, after the first network element sends the reject message to the second network element, the first network element receives the first response message from the second network element, and processes the first response message. After processing the first response message, the first network element may send a resending request message to the second network element. The resending request message is used to trigger the second network element to re-initiate a request message for the second request message. After receiving the resending request message, the second network element may send a third request message to the first network element. The third request message is a request message re-initiated for the second request message. Then the first network element processes the third request message, and sends a third response message for the third request message to the second network element. The third response message belongs to the second HTTP interaction procedure.

Implementation method 4: If the first network element determines that a priority of the second HTTP interaction procedure is higher than that of the first HTTP interaction procedure, the first network element processes the second request message.

In the implementation method, if the first network element determines that the priority of the second HTTP interaction procedure is higher than that of the first HTTP interaction procedure, when receiving the second request message, the first network element preferentially processes the second request message although the first network element has not received the first response message in the first HTTP interaction procedure.

Further, after processing the second request message, if the first network element receives the first response message from the second network element, the first network element discards the first response message.

According to a second aspect, this application provides a message processing method. The method includes: A first network element sends a first message to a second network element. The first message includes reset flag information and a sequence number. The first network element uses the sequence number in the first message as an interaction sequence number of the first network element, and increases the interaction sequence number of the first network element by a specified step to obtain a waiting sequence number of the first network element. The second network element receives the first message from the first network element. If the reset flag information is first reset flag information, and the sequence number in the first message is the same as a waiting sequence number of the second network element, the second network element processes the first message, uses the sequence number in the first message as an interaction sequence number of the second network element, and increases the interaction sequence number of the second network element by the specified step to obtain a waiting sequence number of the second network element. The interaction sequence number of the first network element is used to indicate a sequence number of a message currently exchanged between the first network element and the second network element, the waiting sequence number of the first network element is used to indicate a sequence number of a next message for which the first network element currently waits, the interaction sequence number of the second network element is used to indicate a sequence number of a message currently exchanged between the second network element and the first network element, and the waiting sequence number of the second network element is used to indicate a sequence number of a next message for which the second network element currently waits. Based on this solution, the first network element records the interaction sequence number and the waiting sequence number, and the second network element also records the interaction sequence number and the waiting sequence number. When the first network element sends the first message to the second network element, if the second network element determines that the reset flag information carried in the first message is the first reset flag information, the second network element determines that the first message is not an initial message exchanged between the first network element and the second network element, which may mean that the first reset flag information is used to indicate that the first message is not the initial message exchanged between the first network element and the second network element. Then, if the second network element determines that the waiting sequence number of the second network element is the same as the sequence number in the first message, the second network element determines that the first message is a message currently waiting for being processed, and therefore may process the first message. Further, after sending the first message, the first network element needs to update the locally recorded interaction sequence number and waiting sequence number. Similarly, after processing the first message, the second network element also needs to update the locally recorded interaction sequence number and waiting sequence number. In this way, orderly message interaction between the first network element and the second network element can be implemented.

In an implementation, in the foregoing embodiment, if the reset flag information is the first reset flag information, and the sequence number in the first message is different from the waiting sequence number of the second network element, it indicates that the first message is an out-of-order message, and the second network element buffers the first message. In other words, if the second network element determines that the first message is not a message for which the second network element waits, the second network element first buffers the first message. Further, the second network element may receive another message sent by the first network element, or send another message to the first network element, and update the locally stored interaction sequence number and waiting sequence number. Then the second network element may determine whether a current waiting sequence number of the second network element is the same as the sequence number in the first message. If the current waiting sequence number of the second network element is the same as the sequence number in the first message, the second network element processes the first message, uses the sequence number in the first message as an interaction sequence number of the second network element, and increases the interaction sequence number of the second network element by the specified step to obtain a waiting sequence number of the second network element. If the current waiting sequence number of the second network element is different from the sequence number in the first message, the second network element does not process the first message until the second network element determines that a current waiting sequence number of the second network element is the same as the sequence number in the first message. In this way, orderly message processing can be implemented.

In another implementation, in the foregoing embodiment, if the reset flag information is second reset flag information, the second network element determines that the first message is an initial message exchanged between the first network element and the second network element, which may mean that the second reset flag information is used to indicate that the first message is the initial message exchanged between the first network element and the second network element, and therefore, the second network element may process the first message. Then the second network element uses the sequence number in the first message as an interaction sequence number of the second network element, and increases the interaction sequence number of the second network element by the specified step to obtain a waiting sequence number of the second network element.

After the second network element receives a first response message, the second network element may further send a second message to the first network element. The second message includes the first reset flag information and a sequence number, and the sequence number in the second message is a sum of the current interaction sequence number of the second network element and the specified step. The second network element uses the sequence number in the second message as an interaction sequence number of the second network element, and increases the interaction sequence number of the second network element by the specified step to obtain a waiting sequence number of the second network element. The first network element receives the second message from the second network element. If the sequence number in the second message is the same as the waiting sequence number of the first network element, the first network element processes the second message, uses the sequence number in the second message as an interaction sequence number of the first network element, and increases the interaction sequence number of the first network element by the specified step to obtain a waiting sequence number of the first network element. If the sequence number in the second message is different from the waiting sequence number of the first network element, the first network element buffers the second message.

According to a third aspect, this application further provides a message processing method. The method includes: A first network element sends a first message to a second network element. The first message includes a sequence number. The first network element uses the sequence number in the first message as an interaction sequence number of the first network element, and increases the interaction sequence number of the first network element by a specified step to obtain a waiting sequence number of the first network element. The interaction sequence number of the first network element is used to indicate a sequence number of a message currently exchanged between the first network element and the second network element, and the waiting sequence number of the first network element is used to indicate a sequence number of a next message for which the first network element waits.

In a possible implementation, the first message further includes second reset flag information, and the second reset flag information is used to indicate that the first message is an initial message exchanged between the first network element and the second network element.

In another possible implementation, the first message further includes first reset flag information, and the first reset flag information is used to indicate that the first message is not an initial message exchanged between the first network element and the second network element.

According to a fourth aspect, this application further provides a message processing method. The method includes: A second network element receives a first message from a first network element. The first message includes reset flag information and a sequence number. If the reset flag information is first reset flag information, and the sequence number in the first message is the same as a waiting sequence number of the second network element, the second network element processes the first message, uses the sequence number in the first message as an interaction sequence number of the second network element, and increases the interaction sequence number of the second network element by a specified step to obtain a waiting sequence number of the second network element. The interaction sequence number of the second network element is used to indicate a sequence number of a message currently exchanged between the second network element and the first network element, and the waiting sequence number of the second network element is used to indicate a sequence number of a next message for which the second network element currently waits. Based on this solution, when the first network element sends the first message to the second network element, if the second network element determines that the reset flag information carried in the first message is the first reset flag information, the second network element determines that the first message is not an initial message exchanged between the first network element and the second network element, which may mean that the first reset flag information is used to indicate that the first message is not the initial message exchanged between the first network element and the second network element. Then, if the second network element determines that the waiting sequence number of the second network element is the same as the sequence number in the first message, the second network element determines that the first message is a message currently waiting for being processed, and therefore may process the first message. Further, after processing the first message, the second network element also needs to update the locally recorded interaction sequence number and waiting sequence number. In this way, orderly message interaction between the first network element and the second network element can be implemented.

In an implementation, in the foregoing embodiment, if the reset flag information is the first reset flag information, and the sequence number in the first message is different from the waiting sequence number of the second network element, it indicates that the first message is an out-of-order message, and the second network element buffers the first message. In other words, if the second network element determines that the first message is not a message for which the second network element waits, the second network element first buffers the first message. Further, the second network element may receive another message sent by the first network element, or send another message to the first network element, and update the locally stored interaction sequence number and waiting sequence number. Then the second network element may determine whether a current waiting sequence number of the second network element is the same as the sequence number in the first message. If the current waiting sequence number of the second network element is the same as the sequence number in the first message, the second network element processes the first message, uses the sequence number in the first message as an interaction sequence number of the second network element, and increases the interaction sequence number of the second network element by the specified step to obtain a waiting sequence number of the second network element. If the current waiting sequence number of the second network element is different from the sequence number in the first message, the second network element does not process the first message until the second network element determines that a current waiting sequence number of the second network element is the same as the sequence number in the first message. In this way, orderly message processing can be implemented.

In another implementation, in the foregoing embodiment, if the reset flag information is second reset flag information, the second network element determines that the first message is the initial message exchanged between the first network element and the second network element, which may mean that the first reset flag information is used to indicate that the first message is the initial message exchanged between the first network element and the second network element, and therefore, the second network element may process the first message. Then the second network element uses the sequence number in the first message as an interaction sequence number of the second network element, and increases the interaction sequence number of the second network element by the specified step to obtain a waiting sequence number of the second network element.

According to a fifth aspect, this application provides an apparatus. The apparatus may be a first network element or a second network element, or may be a chip. The apparatus has a function of implementing the embodiment in any one of the first aspect, the second aspect, the third aspect, and the fourth aspect. The function may be implemented by hardware, or may be implemented by hardware by executing corresponding software. The hardware or the software includes one or more modules corresponding to the function.

According to a sixth aspect, an apparatus is provided, including a processor and a memory. The memory is configured to store a computer executable instruction. When the apparatus runs, the processor executes the computer executable instruction stored in the memory, so that the apparatus performs the message processing method according to any one of the first aspect and the implementations of the first aspect, or the apparatus performs the message processing method according to any one of the second aspect and the implementations of the second aspect, or the apparatus performs the message processing method according to any one of the third aspect and the implementations of the third aspect, or the apparatus performs the message processing method according to any one of the fourth aspect and the implementations of the fourth aspect.

According to a seventh aspect, this application further provides a computer-readable storage medium. The computer-readable storage medium stores an instruction, and when the instruction runs on a computer, the computer performs the method in each of the foregoing aspects.

According to an eighth aspect, this application further provides a computer program product including an instruction. When the instruction runs on a computer, the computer performs the method in each of the foregoing aspects.

These aspects or other aspects of this application are clearer and more comprehensible in descriptions of the following embodiments.

DETAILED DESCRIPTION OF ILLUSTRATIVE EMBODIMENTS

To make the objectives, technical solutions, and advantages of this application clearer, the following further describes this application in detail with reference to the accompanying drawings. A specific operation method in the method embodiment may also be applied to the apparatus embodiment or the system embodiment. In the description of this application, unless otherwise stated, "a plurality of" means two or more than two.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that with the evolution of the network architecture and the emergence of new service scenarios, the technical solutions provided in the embodiments of this application are also applicable to similar technical problems.

Figure 1:
FIG. 1 is a schematic diagram of a possible network architecture according to an embodiment of this application.

FIG. 1 is a schematic diagram of a possible network architecture to which this application is applicable. The network architecture includes a first network element and a second network element. The first network element and the second network element herein may be referred to as NF network elements. In an implementation, two NF network elements may invoke and use a service instance of each other by using a serving interface. Certainly, in actual application, the two NF network elements may alternatively communicate through another form of interface.

The first network element and the second network element shown in FIG. 1 may perform the message processing method in this application by using two different implementations. The following separately describes the two implementations.

In a first implementation, the first network element and the second network element may perform the message processing method through the following step A to step C.

Step A: The first network element sends a first request message to the second network element. Correspondingly, the second network element may receive the first request message.

For example, a TCP connection may be established between the first network element and the second network element, and then an HTTP connection is established between the first network element and the second network element on the TCP connection. The HTTP connection may be referred to as a first HTTP connection. Then the first network element sends the first request message to the second network element. Therefore, the first request message belongs to a first HTTP interaction procedure.

Figure 2:
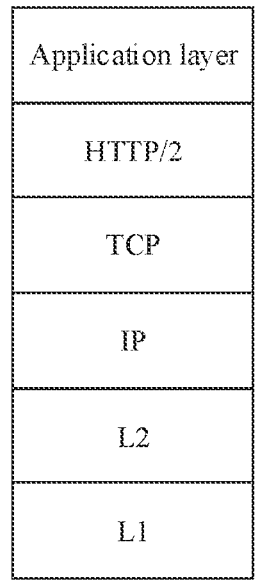
FIG. 2 is an example diagram of a serving interface protocol stack according to an embodiment of this application.
Figure 3:
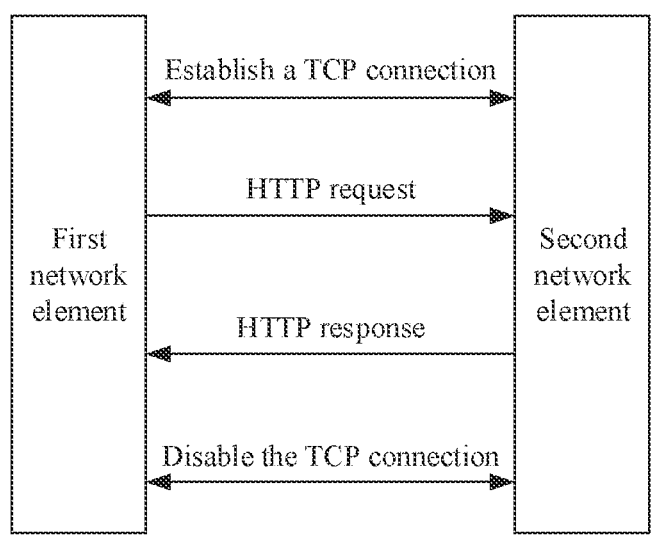
FIG. 3 is a schematic diagram of HTTP protocol interaction according to an embodiment of this application.

FIG. 2 is an example diagram of a serving interface protocol stack according to this application. The first network element and the second network element each include the following protocol layers: an L1 layer, an L2 layer, an Internet protocol (IP) layer, a TCP layer, an HTTP/2 layer, and an application layer. FIG. 3 is a schematic diagram of HTTP protocol interaction according to this application. A TCP connection may be established between the first network element and the second network element, and then the first network element initiates an HTTP request (for example, a first HTTP request) to the second network element, and the second network element may send an HTTP response (for example, a first HTTP response) to the first network element. After the HTTP interaction is completed, the TCP connection may be disabled. In this case, the first network element serves as a service user, and may also be referred to as an HTTP client, and the second network element serves as a service provider, and may also be referred to as an HTTP server. An HTTP connection between the first network element and the second network element is established on the TCP connection, and the TCP connection is a reliable and orderly transmission connection.

After receiving the first request message, the second network element may process the first request message, and after completing processing of the first request message, the second network element further needs to send a first response message for the first request message to the first network element. The first response message also belongs to the first HTTP interaction procedure.

In this application, before the second network element sends the first response message to the first network element, a TCP connection is further established between the second network element and the first network element, and an HTTP connection is established on the TCP connection. The HTTP connection may be referred to as a second HTTP connection. Further, before sending the first response message to the first network element, the second network element sends a second request message to the first network element through the second HTTP connection.

Step B: The second network element sends the second request message to the first network element. Correspondingly, the first network element may receive the second request message.

In other words, the first network element sends the first request message to the second network element through the first HTTP connection, and then the second network element sends the second request message to the first network element through the second HTTP connection. In addition, when receiving the second request message, the first network element has not received the first response message sent by the second network element for the first request message.

Step C: The first network element performs an operation on the second request message based on a relationship between the first HTTP interaction procedure and a second HTTP interaction procedure.

Herein, the relationship between the first HTTP interaction procedure and the second HTTP interaction procedure includes: The first HTTP interaction procedure and second HTTP interaction procedure are independent of each other, and the first HTTP interaction procedure and the second HTTP interaction procedure depend on each other. For example, that the first HTTP interaction procedure and the second HTTP interaction procedure depend on each other includes that the first network element needs to reference content of the received first response message when processing the second request message, in other words, a processing method of the second request message depends on the content of the first response message. For another example, a priority of processing the second request message by the first network element is higher than that of the first response message.

Based on the foregoing embodiment, the first HTTP interaction procedure is established between the first network element and the second network element. The first network element sends the first request message to the second network element in the first HTTP interaction procedure, and before the first network element receives the first response message for the first request message in the first HTTP interaction procedure, the second network element initiates establishment of the second HTTP interaction procedure between the first network element and the second network element, and the first network element receives the second request message sent by the second network element. In this case, if the second request message is directly processed, the second request message may be processed at incorrect time. Therefore, the first network element performs an operation on the second request message based on the relationship between the first HTTP interaction procedure and the second HTTP interaction procedure, to avoid processing the second request message at incorrect time. In this way, orderly message interaction between the first network element and the second network element can be implemented.

In a second implementation, the first network element and the second network element may perform the message processing method in this application through the following step A1 to step C1 or step A1 to step F1.

Step A1: The first network element sends a first message to the second network element. Correspondingly, the second network element may receive the first message.

The first message includes reset flag information and a sequence number. The sequence number is used as a sending number or serial number of the first message.

The reset flag information may be specifically first reset flag information or second reset flag information. The reset flag information herein may also be referred to as reset flag information. The first reset flag information is used to indicate that the first message is not an initial message exchanged between the first network element and the second network element, and the second reset flag information is used to indicate that the first message is the initial message exchanged between the first network element and the second network element. For example, when one bit is used to implement reset flag information, the first reset flag information may be "1", and the second reset flag information may be "0"; or the first reset flag information may be "0", and the second reset flag information may be "1".

Step B1: The first network element uses the sequence number in the first message as an interaction sequence number of the first network element, and increases the interaction a sequence number of the first network element by a specified step to obtain a waiting sequence number of the first network element.

After sending the first message to the second network element, the first network element records the interaction sequence number of the first network element and the waiting sequence number of the first network element. The interaction sequence number of the first network element is used to indicate a sequence number of a message currently exchanged between the first network element and the second network element, and the waiting sequence number of the first network element is used to indicate a sequence number of a next message for which the first network element currently waits.

For example, if the first message is the initial message exchanged between the first network element and the second network element, and messages are numbered from 0, the sequence number carried in the first message is 0, and the reset flag information carried in the first message is the second reset flag information. After sending the first message, the first network element uses 0 as the interaction sequence number, and if the specified step is 1, the first network element increases the interaction sequence number by 1 (that is, 0+1=1) to obtain the waiting sequence number of the first network element. Therefore, after the first network element sends the first message, the interaction sequence number of the first network element is 0, and the waiting sequence number is 1.

For another example, if the first message is not the initial message exchanged between the first network element and the second network element, and messages are numbered from 0, it is assumed that the specified step is 1, an interaction sequence number currently stored in the first network element is 4, and a waiting sequence number currently stored in the first network element is 5, when the first network element is ready to send the first message, the first network element increases the interaction sequence number by 1 to obtain the sequence number in the first message. Therefore, the sequence number carried in the first message is 5, and the reset flag information carried in the first message is the first reset flag information. After sending the first message, the first network element uses 5 as the interaction sequence number, and increases the interaction sequence number by 1 (that is, 5+1=6) to obtain the waiting sequence number of the first network element. Therefore, after the first network element sends the first message, the interaction sequence number of the first network element is updated to 5, and the waiting sequence number is updated to 6.

Step C1: If the reset flag information is the first reset flag information, and the sequence number in the first message is the same as a waiting sequence number of the second network element, the second network element processes the first message, uses the sequence number in the first message as an interaction sequence number of the second network element, and increases the interaction sequence number of the second network element by the specified step to obtain a waiting sequence number of the second network element.

The interaction sequence number of the second network element is used to indicate a sequence number of a message currently exchanged between the second network element and the first network element, and the waiting sequence number of the second network element is used to indicate a sequence number of a next message for which the second network element currently waits.

After receiving the first message, the second network element obtains the sequence number and the reset flag information in the first message.

Case 1: The reset flag information in the first message is the first reset flag information, and the sequence number in the first message is the same as the waiting sequence number of the second network element.

Because the reset flag information is the first reset flag information, and the sequence number in the first message is the same as the waiting sequence number of the second network element, the first message is not the initial message, and the sequence number in the first message is correct, and therefore, the second network element processes the first message.

After processing the first message, the second network element uses the sequence number in the first message as the interaction sequence number of the second network element, and increases the interaction sequence number of the second network element by the specified step to obtain the waiting sequence number of the second network element.

For example, if the sequence number in the first message is 5, the reset flag information is the first reset flag information, an interaction sequence number currently stored in the second network element is 4, and a waiting sequence number currently stored in the second network element is 5, after receiving the first message, the second network element determines that the reset flag information is the first reset flag information, and the sequence number in the first message is the same as the waiting sequence number of the second network element, and therefore, the second network element processes the first message. Further, the second network element updates the interaction sequence number of the second network element to 5, and updates the waiting sequence number to 6. An example in which the specified step is 1 is used.

Case 2: The reset flag information in the first message is the first reset flag information, and the sequence number in the first message is different from the waiting sequence number of the second network element.

Because the reset flag information is the first reset flag information, and the sequence number in the first message is different from the waiting sequence number of the second network element, the first message is not the initial message, but the sequence number in the first message is incorrect, and therefore, the second network element temporarily does not process the first message. Specifically, the second network element may buffer the first message.

After the second network element buffers the first message, further, the second network element may receive another message sent by the first network element, or send another message to the first network element, and update the locally stored interaction sequence number and waiting sequence number. Then the second network element may determine whether a current waiting sequence number of the second network element is the same as the sequence number in the first message. If the current waiting sequence number of the second network element is the same as the sequence number in the first message, the second network element processes the first message, uses the sequence number in the first message as an interaction sequence number of the second network element, and increases the interaction sequence number of the second network element by the specified step to obtain a waiting sequence number of the second network element. If the current waiting sequence number of the second network element is different from the sequence number in the first message, the second network element does not process the first message until the second network element determines that a current waiting sequence number of the second network element is the same as the sequence number in the first message. In this way, orderly message processing can be implemented.

For example, if the sequence number in the first message is 6, the reset flag information is the first reset flag information, an interaction sequence number currently stored in the second network element is 4, and a waiting sequence number currently stored in the second network element is 5, after receiving the first message, the second network element determines that the reset flag information is the first reset flag information, but the sequence number in the first message is different from the waiting sequence number of the second network element, and therefore, the second network element buffers the first message. Subsequently, if the second network element receives another message sent by the first network element, a sequence number in the message is 5, and reset flag information is the first reset flag information, the second network element processes the another message, updates the locally stored interaction sequence number to 5, and updates the waiting sequence number to 6. Then the second network element obtains the first message from a buffer, and determines that the sequence number in the first message is the same as the current waiting sequence number of the second network element, and therefore processes the first message, updates the interaction sequence number of the second network element to 6, and updates the waiting sequence number to 7. An example in which the specified step is 1 is used.

Case 3: The reset flag information in the first message is the second reset flag information.

Because the reset flag information in the first message is the second reset flag information, it indicates that the first message is the initial message exchanged between the first network element and the second network element, and therefore, the second network element processes the first message, uses the sequence number in the first message as the interaction sequence number of the second network element, and increases the interaction sequence number of the second network element by the specified step to obtain the waiting sequence number of the second network element. Specifically, if messages are numbered from 0, the sequence number carried in the first message is 0, and the reset flag information carried in the first message is the second reset flag information. After receiving the first message, the second network element uses 0 as the interaction sequence number of the second network element, and increases the interaction sequence number by 1 (that is, 0+1=1) to obtain the waiting sequence number of the second network element. Therefore, the interaction sequence number of the second network element is 0, and the waiting sequence number is 1. An example in which the specified step is 1 is used.

Based on the foregoing embodiment, the first network element records the interaction sequence number and the waiting sequence number, and the second network element also records the interaction sequence number and the waiting sequence number. When the first network element sends the first message to the second network element, if the second network element determines that the reset flag information carried in the first message is the first reset flag information, the second network element determines that the first message is not the initial message exchanged between the first network element and the second network element. Then, if the second network element determines that the waiting sequence number of the second network element is the same as the sequence number in the first message, the second network element determines that the first message is a message currently waiting for being processed, and therefore may process the first message. Further, after sending the first message, the first network element needs to update the locally recorded interaction sequence number and waiting sequence number. Similarly, after processing the first message, the second network element also needs to update the locally recorded interaction sequence number and waiting sequence number. In this way, orderly message interaction between the first network element and the second network element can be implemented.

Further, after step C1, the following step D1 to step F1 may be included:

Step D1: The second network element sends a second message to the first network element. Correspondingly, the first network element may receive the second message.

The second message includes the first reset flag information and a sequence number, and the sequence number in the second message is a sum of a current interaction sequence number of the second network element and the specified step.

Step E1: The second network element uses the sequence number in the second message as an interaction sequence number of the second network element, and increases the interaction sequence number of the second network element by the specified step to obtain a waiting sequence number of the second network element.

Step F1: If the sequence number in the second message is the same as a waiting sequence number of the first network element, the first network element processes the second message, uses the sequence number in the second message as an interaction sequence number of the first network element, and increases the interaction sequence number of the first network element by the specified step to obtain a waiting sequence number of the first network element. If the sequence number in the second message is different from the waiting sequence number of the first network element, the first network element buffers the second message.

Processing logic of step D1 to step F1 is similar to the processing logic of step A1 to step C1. For details, refer to the foregoing description. Details are not described herein again.

In a specific implementation, a sequence ensuring layer may be added to an NF network element. For example, the sequence ensuring layer is added to the application layer of the protocol stack shown in FIG. 2. The sequence ensuring layer is used to ensure a sequence of messages received and sent by the NF network element. Based on this implementation, in an example in which the specified step is 1 and messages are numbered from 0, specific implementation of the embodiment of the second implementation is as follows:

Before step A1, an application layer of the first network element generates a message, and then sends the message to a sequence ensuring layer of the first network element.

If the message is the initial message exchanged between the first network element and the second network element, the sequence ensuring layer of the first network element adds a sequence number 0 and the second reset flag information to the message to obtain the first message, and then sends the first message to the second network element through step A1. Further, the sequence ensuring layer of the first network element performs step B1. After receiving the first message, a sequence ensuring layer of the second network element determines that the reset flag information is the second reset flag information, and therefore sets an interaction sequence number of the second network element to 0, sets a waiting sequence number of the second network element to 1, and then sends information other than the sequence number and the reset flag information in the first message to an application layer of the second network element for processing.

If the message is not the initial message exchanged between the first network element and the second network element, the sequence ensuring layer of the first network element adds a sequence number N (N=current interaction sequence number of the first network element+1) and the first reset flag information to the message to obtain the first message, and then sends the first message to the second network element through step A1. Further, the sequence ensuring layer of the first network element performs step B1. After a sequence ensuring layer of the second network element receives the first message, if the sequence ensuring layer of the second network element determines that the reset flag information is the first reset flag information, and the sequence number in the first message is the same as a waiting sequence number of the second network element, the sequence ensuring layer of the second network element sets an interaction sequence number of the second network element to N, sets a waiting sequence number of the second network element to N+1, and then sends information other than the sequence number and the reset flag information in the first message to an application layer of the second network element for processing. After the sequence ensuring layer of the second network element receives the first message, if the sequence ensuring layer of the second network element determines that the reset flag information is the first reset flag information, and the sequence number in the first message is different from a waiting sequence number of the second network element, the sequence ensuring layer buffers the first message.

Figure 4:
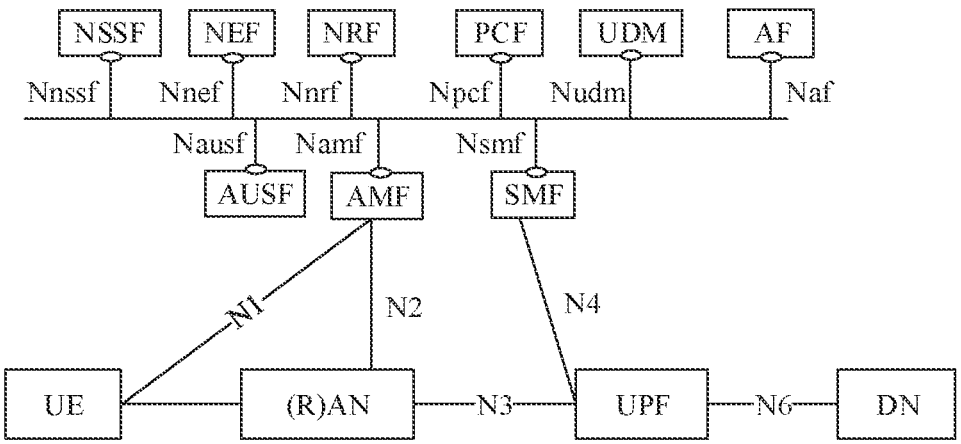
FIG. 4 is a schematic diagram of another possible network architecture according to an embodiment of this application.

FIG. 4 is a schematic diagram of another possible network architecture to which this application is applicable. The network architecture is a 5G network architecture. The network architecture includes a core network element and a (radio) access network ((R)AN) device. The core network element includes a session management function (SMF) network element, an access and mobility management function (AMF) network element, a user plane function (UPF) network element, a unified data management (UDM) network element, an authentication server function (AUSF) network element, a policy control function (PCF) network element, a network exposure function (NEF) network element, a network repository function (NRF) network element, a network slice selection function (NSSF) network element, an authentication server function (AUSF) network element, and the like. The network architecture may serve a data network (DN), user equipment (UE), and an application function (AF) server.

The SMF network element is responsible for session management such as user session establishment. The AMF network element is mainly used for mobility management, for example, user location update, registration of a user with a network, and user handover, in a mobile network. The UPF network element is mainly responsible for connecting to an external network, including related functions of a long term evolution (LTE) serving gateway (SGW) and a public data network gateway (PDN-GW). The PCF network element includes a user subscription data management function, a policy control function, a charging policy control function, a quality of service (QoS) control function, and the like. The AUSF network element has an authentication service function. The UDM network element may store user subscription information and the like. The NSSF network element is mainly configured to determine a network slice instance, select an AMF network element, and the like. The NEF network element securely provides, to a third party, for example, a vertical industry user or an application server, a service and a capability provided by the mobile network.

The UE communicates with the AMF network element through an N1 interface, the (R)AN device communicates with the AMF network element through an N2 interface, the (R)AN device communicates with the UPF network element through an N3 interface, the UPF network element communicates with the SMF network element through an N4 interface, and the UPF network element communicates with the DN through an N6 interface. A control plane of the network architecture uses a serving architecture, and NF network elements communicate and interact with each other through a serving interface. NF network elements of the control plane include an AMF network element, an SMF network element, an AUSF network element, an NSSF network element, an NEF network element, an NRF network element, a PCF network element, and a UDM network element. For example, in an implementation, serving interfaces of the control plane may include Namf, Nsmf, Nausf, Nssf, Nnef, Nnrf, Npcf, Nudm, and the like.

The first network element and the second network element in this application each may be the foregoing AMF network element, SMF network element, AUSF network element, NSSF network element, NEF network element, NRF network element, PCF network element, or UDM network element, and the first network element and the second network element are different network elements.

It may be understood that the foregoing function may be a network element in a hardware device, may be a software function running on dedicated hardware, or may be a virtualized function instantiated on a platform (for example, a cloud platform).

For ease of description, in this application, subsequently, the AMF network element, the SMF network element, the AUSF network element, the NSSF network element, the NEF network element, the NRF network element, the PCF network element, and the UDM network element are respectively referred to as an AMF, an SMF, an AUSF, an NSSF, an NEF, an NRF, a PCF, and a UDM.

It should be noted that name of messages in the embodiments of this application are only examples, and the names constitute no limitation on the messages. In 5G communication and other future communication, the messages in the embodiments of this application may also have other names. This is not specifically limited in the embodiments of this application.

With reference to FIG. 5 to FIG. 11, the following specifically describes the first implementation in the system architecture shown in FIG. 1. A first request message and a first response message belong to a first HTTP interaction procedure, and a second request message and a second response message belong to a second HTTP interaction procedure. In other words, two HTTP connections are established between a first network element and a second network element.

Figure 5:
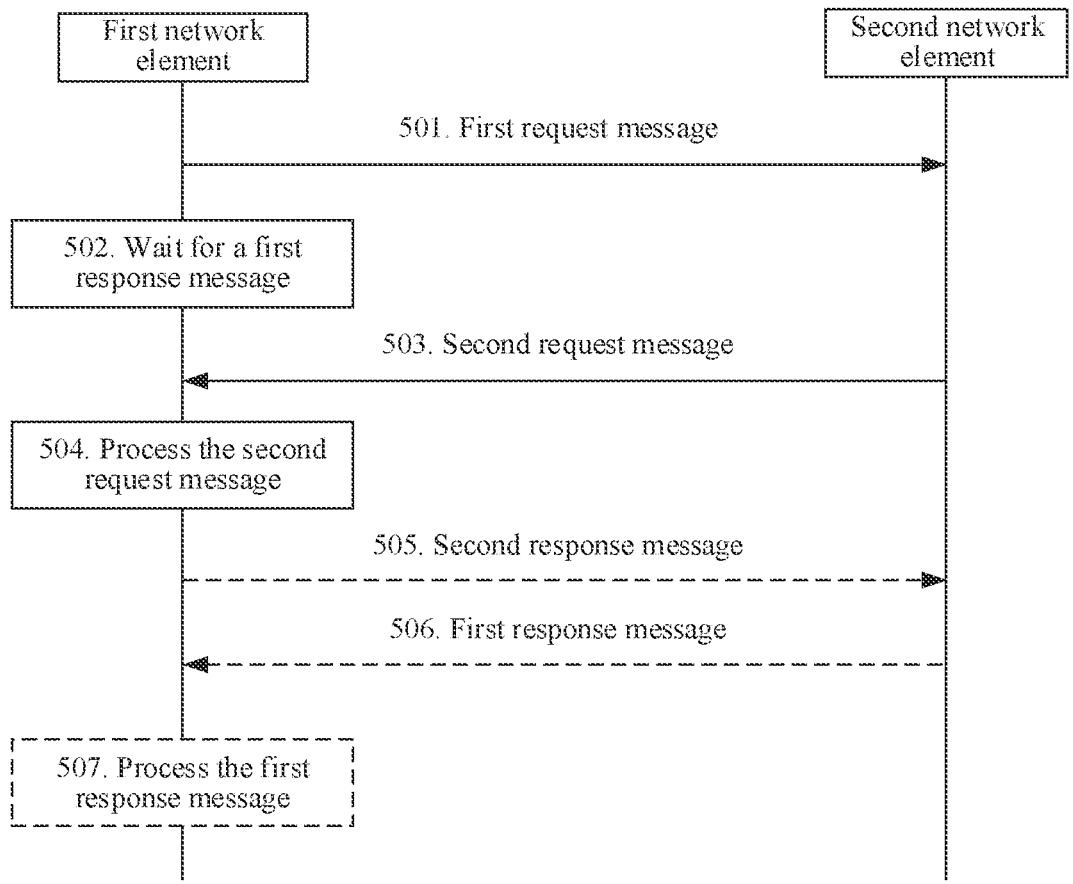
FIG. 5 is a schematic flowchart of a message processing method according to an embodiment of this application.

FIG. 5 is a schematic flowchart of a message processing method according to this application. In the method, if a first network element determines that a first HTTP interaction procedure and a second HTTP interaction procedure are independent of each other, the first network element processes a second request message. In the implementation method, because the first HTTP interaction procedure and the second HTTP interaction procedure are independent of each other, or in other words, there is no interdependence between the first HTTP interaction procedure and the second HTTP interaction procedure, after receiving the second request message, the first network element may process the second request message without waiting for receiving and processing a first response message in the first HTTP interaction procedure.

The method includes the following steps.

Step 501: The first network element sends a first request message to the second network element. Correspondingly, the second network element may receive the first request message.

After receiving the first request message, the second network element may process the first request message.

Step 502: The first network element waits for a first response message.

Step 503: The second network element sends a second request message to the first network element. Correspondingly, the first network element may receive the second request message.

Step 504: The first network element processes the second request message.

In this step, the first network element determines that a first HTTP interaction procedure and a second HTTP interaction procedure are independent of each other. Therefore, when receiving the second request message, the first network element processes the second request message although the first network element has not received the first response message.

Further, the method may include the following step 505 to step 507.

Step 505: The first network element sends a second response message to the second network element. Correspondingly, the second network element may receive the second response message.

After receiving the second response message, the second network element may process the second response message. The second response message belongs to the second HTTP interaction procedure.

Step 506: The second network element sends the first response message to the first network element. Correspondingly, the first network element may receive the first response message.

Step 507: The first network element processes the first response message.

Through the foregoing step 505 to step 507, after processing the second request message, the first network element may further send the second response message for the second request message to the second network element. Further, after the first network element sends the second response message, if the first network element receives the first response message from the second network element, the first network element processes the first response message.

In an alternative implementation, step 505 may be performed after step 506 and before step 507, or may be performed after step 507, and this is not limited in this application.

Figure 6:
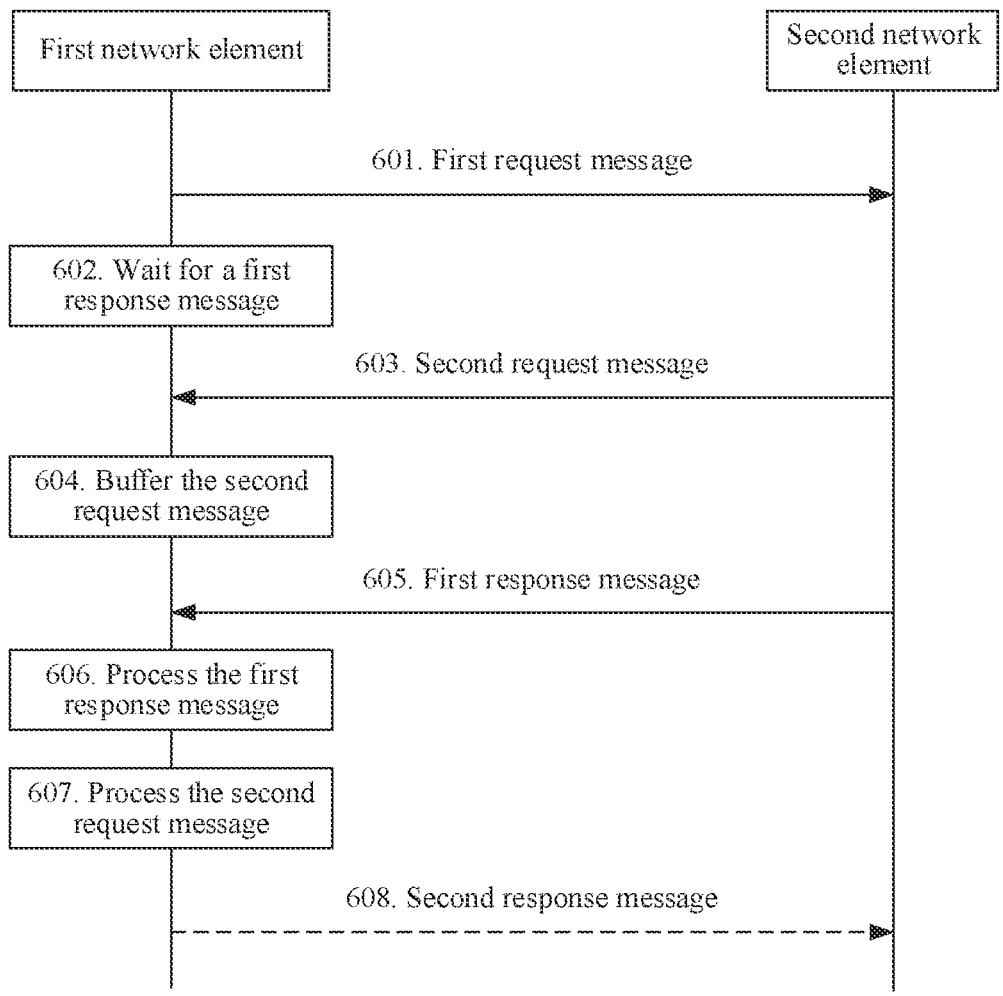
FIG. 6 is a schematic flowchart of another message processing method according to an embodiment of this application.

FIG. 6 is a schematic flowchart of another message processing method according to this application. In the method, if a first network element determines that a second HTTP interaction procedure depends on a first HTTP interaction procedure and a second request message cannot be rejected, the first network element buffers the second request message. After receiving and processing a first response message, the first network element processes the second request message. In the implementation method, because the second HTTP interaction procedure depends on the first HTTP interaction procedure and the second request message cannot be rejected, the first network element may first buffer the second request message. After receiving and processing a first response message, the first network element obtains the buffered second request message, and then processes the second request message. That the second HTTP interaction procedure depends on the first HTTP interaction procedure may mean that when processing the second request message, the first network element depends on the first response message received by the first network element, and therefore, needs to first receive and process the first response message.

The method includes the following steps.

Step 601: The first network element sends a first request message to a second network element. Correspondingly, the second network element may receive the first request message.

After receiving the first request message, the second network element may process the first request message.

Step 602: The first network element waits for a first response message.

Step 603: The second network element sends a second request message to the first network element. Correspondingly, the first network element may receive the second request message.

Step 604: The first network element buffers the second request message.

In this step, the first network element determines that a second HTTP interaction procedure depends on a first HTTP interaction procedure and the second request message cannot be rejected, and therefore, the first network element buffers the second request message when receiving the second request message.

That the second request message cannot be rejected herein means that once the first network element rejects the second request message, the second request message cannot be re-initiated, which may lead to an error. For example, when the second request message is sent by the second network element, which is triggered when the second network element receives the first request message, the second request message is a message that cannot be rejected by the first network element. Because the first network element does not resend the first request message to the second network element, once the first network element rejects the second request message, no request message is resent for the second request message.

Step 605: The second network element sends the first response message to the first network element. Correspondingly, the first network element may receive the first response message.

Step 606: The first network element processes the first response message.

Step 607: The first network element processes the second request message.

Because the first network element has processed the first response message, in other words, the first response message on which the second request message depends has been processed, the first network element may obtain the second request message from a buffer and process the second request message.

Further, the method may include the following step 608.

Step 608: The first network element sends a second response message to the second network element. Correspondingly, the second network element may receive the second response message.

After receiving the second response message, the second network element may process the second response message. The second response message belongs to the second HTTP interaction procedure.

Figure 7:
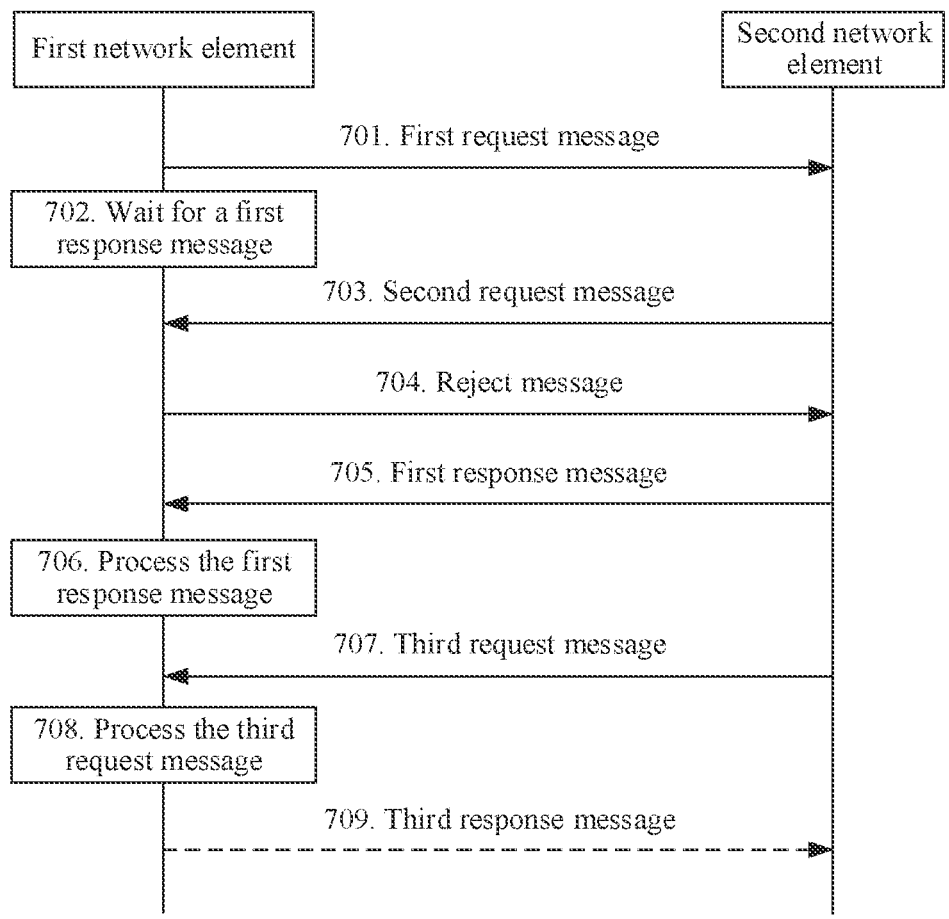
FIG. 7 is a schematic flowchart of still another message processing method according to an embodiment of this application.

FIG. 7 is a schematic flowchart of still another message processing method according to this application. In the method, if a first network element determines that a second HTTP interaction procedure depends on a first HTTP interaction procedure and a second request message can be rejected, the first network element sends a reject message to a second network element. In the implementation method, because the second HTTP interaction procedure depends on the first HTTP interaction procedure and the second request message can be rejected, the first network element may send the reject message to the second network element. Subsequently, the second network element may re-initiate a request message.

The method includes the following steps.

Step 701: The first network element sends a first request message to the second network element. Correspondingly, the second network element may receive the first request message.

After receiving the first request message, the second network element may process the first request message.

Step 702: The first network element waits for a first response message.

Step 703: The second network element sends a second request message to the first network element. Correspondingly, the first network element may receive the second request message.

Step 704: The first network element sends a reject message to the second network element. Correspondingly, the second network element may receive the reject message.

In this step, the first network element determines that a second HTTP interaction procedure depends on a first HTTP interaction procedure and the second request message can be rejected, and therefore, the first network element sends the reject message to the second network element when receiving the second request message.

That the second request message can be rejected herein means that after the first network element rejects the second request message, a request message may be subsequently re-initiated for the second request message.

Optionally, the reject message may carry a cause value "reject". Further, the reject message may carry specified duration. The specified duration may be understood as a timer or a delay time (DelayTime), and is used to indicate the second network element to re-initiate a request message after the specified duration.

Step 705: The second network element sends the first response message to the first network element. Correspondingly, the first network element may receive the first response message.

Step 706: The first network element processes the first response message.

Step 707: The second network element sends a third request message to the first network element. Correspondingly, the first network element may receive the third request message.

After the first network element processes the first response message, if the first network element receives the third request message sent by the second network element when the specified duration expires, the first network element processes the third request message. The third request message is a request message re-initiated for the second request message, which may also mean that the third request message is a message with a same function as the second request message. The third request message belongs to the second HTTP interaction procedure.

Step 708: The first network element processes the third request message.

Because the first network element has processed the first response message, in other words, the first response message on which the third request message depends has been processed, the first network element may process the third request message.

Further, the method may include the following step 709.

Step 709: The first network element sends a third response message to the second network element. Correspondingly, the second network element may receive the third response message.

After receiving the third response message, the second network element may process the third response message. The third response message belongs to the second HTTP interaction procedure.

It should be noted that if the first network element has not received the first response message or processed the first response message when receiving the third request message, the first network element may send a reject message to the second network element again. The first network element does not process the third request message re-initiated for the second request message, until the first network element has processed the first response message.

In the foregoing embodiment, if the first network element receives the second request message before receiving the first response message, the first network element first rejects the second request message. Subsequently, the second network element re-initiates the third request message for the second request message. After processing the first response message, the first network element processes the third request message. Therefore, correct message interaction between the first network element and the second network element is implemented.

In another implementation, if the reject message in step 704 does not carry the specified duration, in other words, the first network element only indicates that the second request message is rejected, but does not notify when the second network element is to re-initiate a request, after step 706 and before step 707, the method may further include the following step A2.

Step A2: The first network element sends a resending request message to the second network element. Correspondingly, the second network element may receive the resending request message.

The resending request message is used to trigger the second network element to re-initiate a request message for the second request message.

After receiving the resending request message, the second network element may send a third request message to the first network element, that is, perform the foregoing step 707. In other words, in this embodiment, after processing the first response message, the first network element actively notifies the second network element to re-initiate a request message, namely, the third request message, for the second request message.

Optionally, after step A2, the method may further include the following step B2.

Step B2: The second network element sends a resending response message to the first network element, and the first network element receives the resending response message from the second network element.

Figure 8:
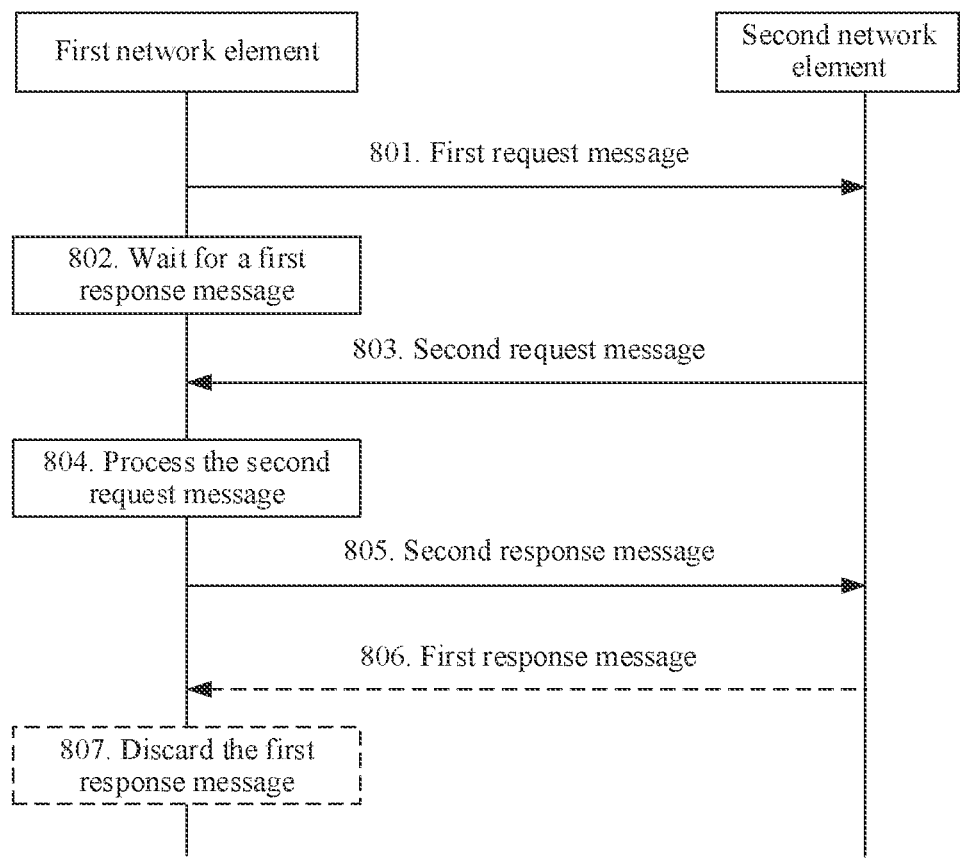
FIG. 8 is a schematic flowchart of yet another message processing method according to an embodiment of this application.

FIG. 8 is a schematic flowchart of yet another message processing method according to this application. In the method, if a first network element determines that a priority of a second HTTP interaction procedure is higher than that of a first HTTP interaction procedure, when receiving a second request message, the first network element preferentially processes the second request message although the first network element has not received a first response message in the first HTTP interaction procedure.

The method includes the following steps.

Step 801: The first network element sends a first request message to a second network element. Correspondingly, the second network element may receive the first request message.

After receiving the first request message, the second network element may process the first request message.

Step 802: The first network element waits for a first response message.

Step 803: The second network element sends a second request message to the first network element. Correspondingly, the first network element may receive the second request message.

Step 804: The first network element processes the second request message.

In this step, the first network element determines that a priority of a second HTTP interaction procedure is higher than that of a first HTTP interaction procedure, and therefore, when receiving the second request message, the first network element preferentially processes the second request message although the first network element has not received the first response message in the first HTTP interaction procedure.

Step 805: The first network element sends a second response message to the second network element. Correspondingly, the second network element may receive the second response message.

After receiving the second response message, the second network element may process the second response message. The second response message belongs to the second HTTP interaction procedure.

Further, the method may include the following step 806 and step 807.

Step 806: The second network element sends the first response message to the first network element. Correspondingly, the first network element may receive the first response message.

Step 807: The first network element discards the first response message.

Because the first HTTP interaction procedure and the second HTTP interaction procedure are not independent of each other, and the priority of the second HTTP interaction procedure is higher than that of the first HTTP interaction procedure, after processing the second request message, the first network element may not need to process the first response message, and therefore may discard the first response message.

With reference to the application scenario in the system shown in FIG. 4, the following describes the foregoing implementation methods by using examples.

Figure 9:
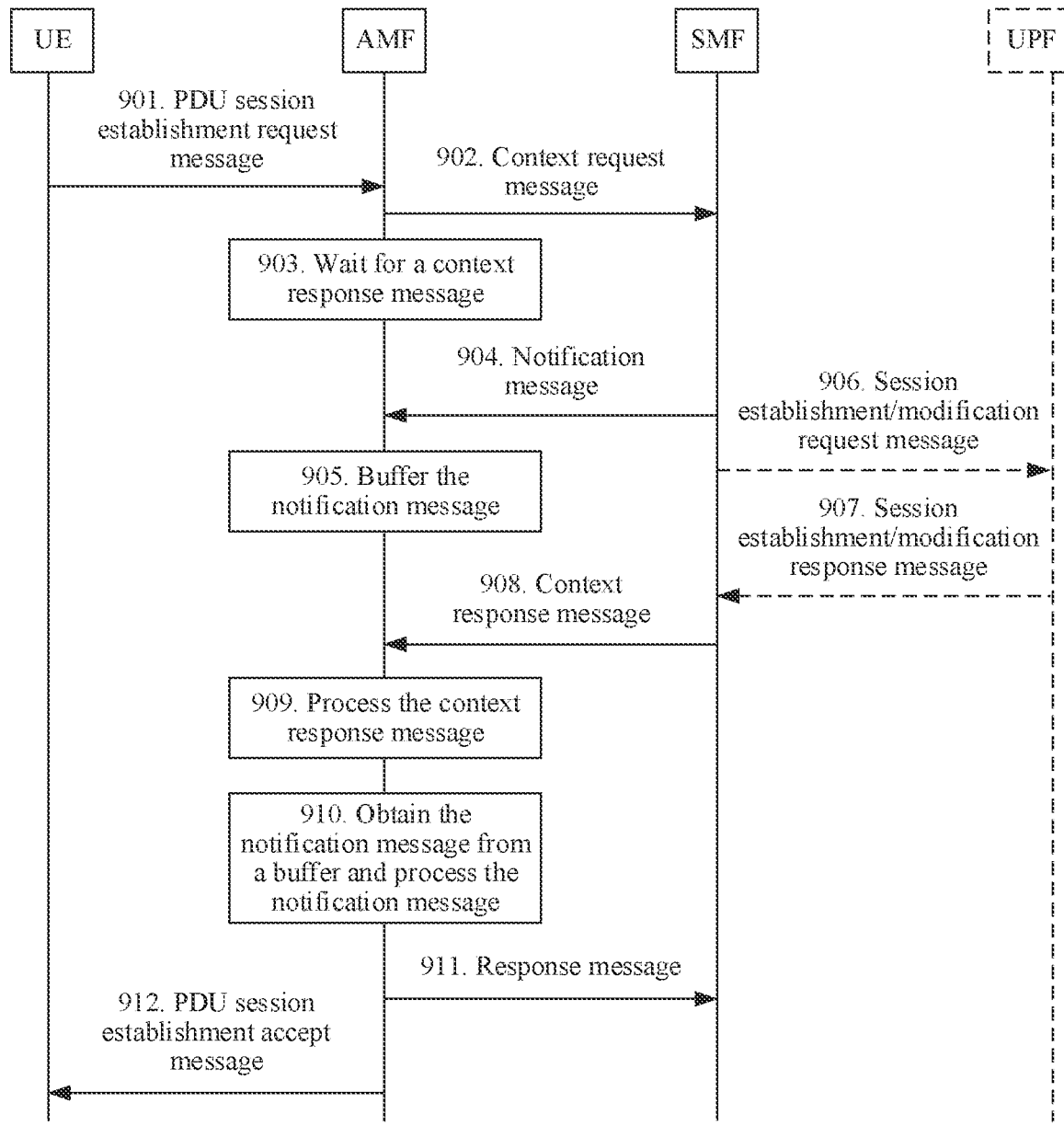
FIG. 9 is a schematic flowchart of PDU session establishment.

FIG. 9 is a schematic flowchart of protocol data unit (PDU) session establishment. This embodiment describes an application scenario for the embodiment shown in FIG. 6. The first network element is specifically an AMF, and the second network element is specifically an SMF. The first request message in the embodiment shown in FIG. 6 is specifically a context request message, the first response message is specifically a context response message, the second request message is specifically a notification message, and the second response message is specifically a response message. The context request message and the context response message are in one HTTP interaction procedure, and the notification message and the response message are in another HTTP interaction procedure.

The procedure includes the following steps.

Step 901: UE sends a PDU session establishment request message to the AMF. Correspondingly, the AMF may receive the PDU session establishment request message.

Step 902: The AMF sends a context request message to the SMF. Correspondingly, the SMF may receive the context request message.

The context request message is a create session management context request message, for example, may be specifically an Nsmf_PDUSession_CreateSMContext Request message.

Step 903: The AMF waits for a context response message.

The context response message is a create session management context response message, for example, may be specifically an Nsmf_PDUSession_CreateSMContext Response message.

Step 904: The SMF sends a notification message to the AMF. Correspondingly, the AMF may receive the notification message.

The notification message may be specifically an Namf_Communication_N1N2MessageTransfer Request message.

Because of an out-of-order problem, in this step, the AMF receives the notification message that should be received after step 908.

Step 905: The AMF buffers the notification message.

After receiving the notification message, the AMF determines that a second HTTP interaction procedure depends on a first HTTP interaction procedure, which, for example, may be specifically that processing of the notification message depends on processing of the context response message. Therefore, the AMF buffers the notification message and temporarily does not process the notification message.

Step 906: The SMF sends a session establishment/modification request message to a UPF. Correspondingly, the UPF may receive the session establishment/modification request message.

Step 907: The UPF sends a session establishment/modification response message to the SMF. Correspondingly, the SMF may receive the session establishment/modification response message.

Through the foregoing step 906 and step 907, the SMF interacts with the UPF to establish an N4 session. Step 906 and step 907 are optional steps.

Step 908: The SMF sends the context response message to the AMF. Correspondingly, the AMF may receive the context response message.

The context response message may be specifically an Nsmf_PDUSession_CreateSMContext Response message.

Step 909: The AMF processes the context response message.

Step 910: The AMF obtains the notification message from a buffer and processes the notification message.

Step 911: The AMF sends a response message to the SMF. Correspondingly, the SMF may receive the response message.

The response message may be specifically an Namf_Communication_N1N2MessageTransfer Response message. The response message is a response message for the notification message in step 904.

Step 912: The AMF sends a PDU session establishment accept message to the UE. Correspondingly, the UE may receive the PDU session establishment accept message.

In the foregoing embodiment, because of the out-of-order problem, the AMF receives the notification message before receiving the context response message, and therefore, the AMF buffers the notification message, and does not process the notification message until the context response message is processed, so that orderly processing of messages between different HTTP connections is implemented.

Figure 10:
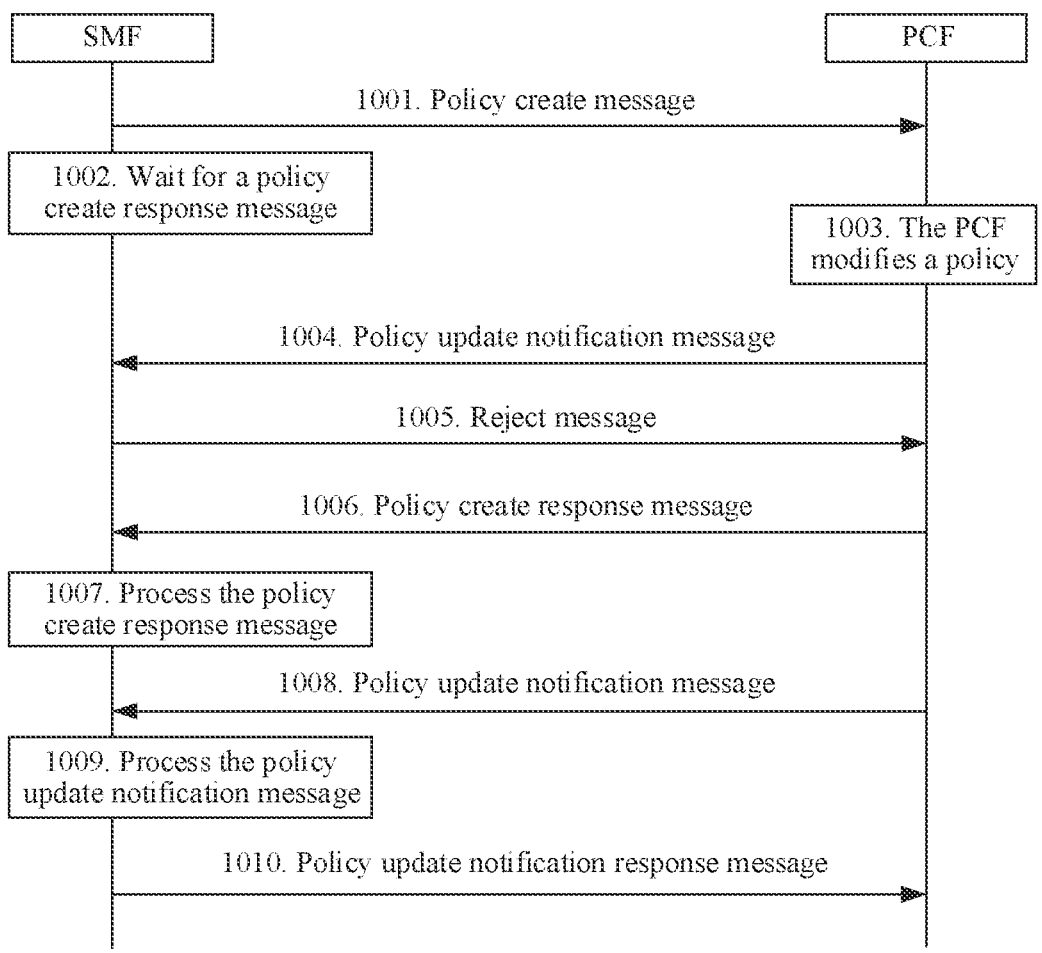
FIG. 10 is a schematic flowchart of SMF policy modification.

FIG. 10 is a schematic flowchart of SMF policy modification. This embodiment describes an application scenario for the embodiment shown in FIG. 7. The first network element is specifically an SMF, and the second network element is specifically a PCF. The first request message in the embodiment shown in FIG. 7 is specifically a policy create message, the first response message is specifically a policy create response message, the second request message is specifically a policy update notification message, and the second response message is specifically a policy update notification response message. The policy create message and the policy create response message are in one HTTP interaction procedure, and the policy update notification message and the policy update notification response message are in another HTTP interaction procedure.

The procedure includes the following steps.

Step 1001: The SMF sends a policy create message to the PCF. Correspondingly, the PCF may receive the policy create message.

The policy create message may be specifically an Npcf_SMPolicyControl_Create message, and is used to obtain a latest policy from the PCF.

Step 1002: The SMF waits for a policy create response message.

Step 1003: The PCF modifies a policy.

It should be noted that in a correct time sequence, this step should be performed after the policy create response message is sent, but because of an out-of-order problem, this step is performed first.

Step 1004: The PCF sends a policy update notification message to the SMF. Correspondingly, the SMF may receive the policy update notification message.

The policy update notification message may be specifically an Npcf_SMPolicyControl_UpdateNotify message.

In a correct time sequence, the policy update notification message should be sent after the PCF sends the policy create response message, but because messages are out of order, the policy update notification message is sent to the SMF in step 1004.

After receiving the policy update notification message, the SMF determines that the SMF is currently in an Npcf_SMFPolicyControl_Create request procedure. Therefore, the SMF determines that this policy modification request of the PCF needs to be rejected.

Step 1005: The SMF sends a reject message to the PCF. Correspondingly, the PCF may receive the reject message.

The reject message may be specifically an Npcf_SMPolicyControl_UpdateNotify Response message, and the message carries a cause value "reject" and TimeDelay. After receiving the message, the PCF starts a timer to wait for resending the policy update notification message.

Step 1006: The PCF sends the policy create response message to the SMF. Correspondingly, the SMF may receive the policy create response message.

The policy create response message may be specifically an Npcf_SMPolicyControl_Create Response message.

Step 1007: The SMF processes the policy create response message.

Step 1008: The PCF resends the policy update notification message to the SMF after the timer expires.

It should be noted that if the PCF has another to-be-modified policy in a waiting process, the PCF may also send the new to-be-modified policy in the policy update notification message to the SMF.

Step 1009: The SMF processes the policy update notification message.

Specifically, the SMF may update a policy based on the policy update notification message and notify the policy to UE.

Step 1010: The SMF sends a policy update notification response message to the PCF. Correspondingly, the PCF may receive the policy update notification response message.

The policy update notification response message may be specifically an Npcf_SMPolicyControl_UpdateNotify Response message.

In the foregoing embodiment, because of the out-of-order problem, the SMF receives the policy update notification message before receiving the policy create response message, and therefore, the SMF rejects the policy update notification message, and does not process the policy update notification message received again, until the policy create response message is processed, so that orderly processing of messages between different HTTP connections is implemented.

Figure 11:
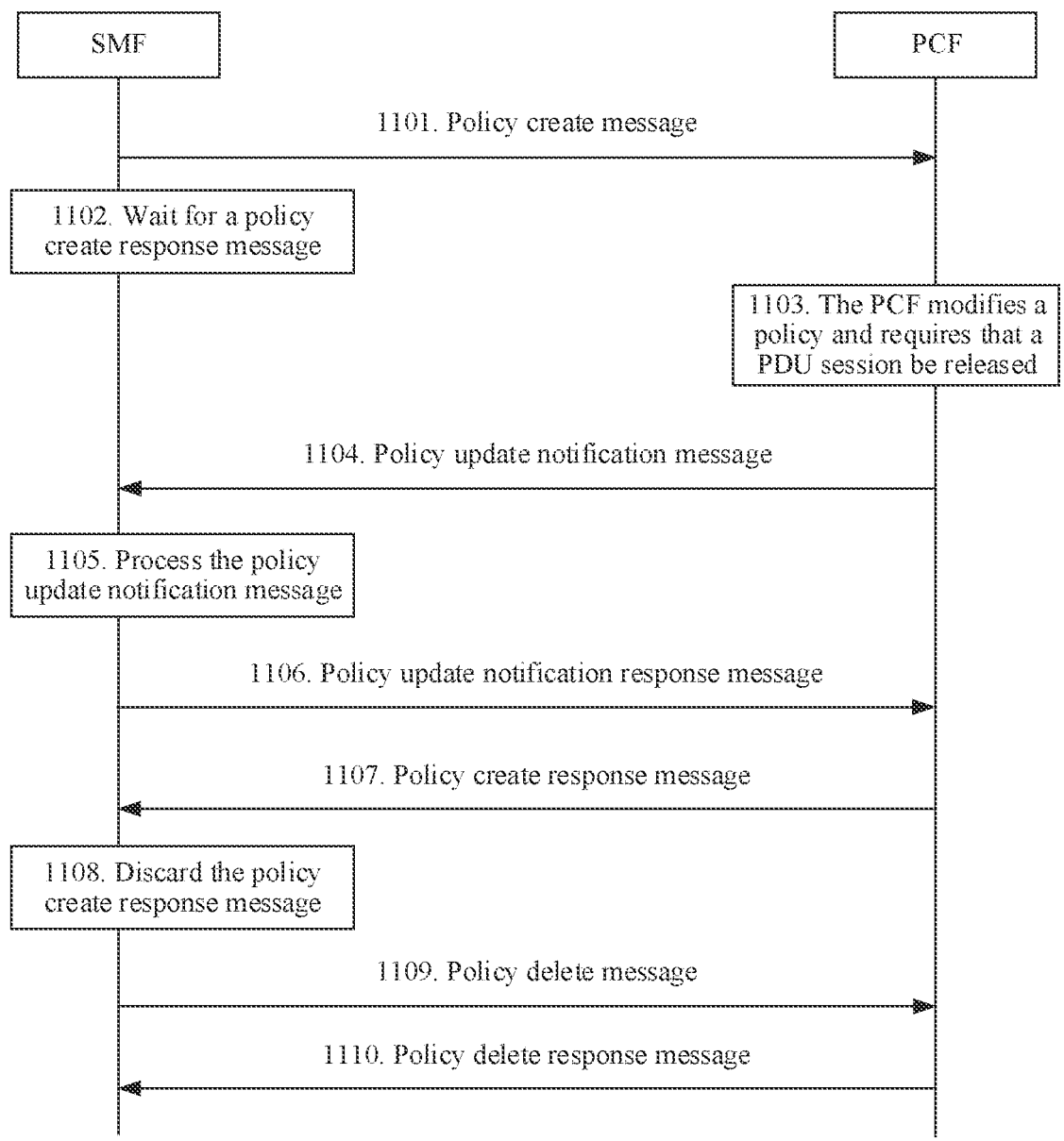
FIG. 11 is a schematic flowchart of PDU session releasing.

FIG. 11 is a schematic flowchart of PDU session releasing. This embodiment describes an application scenario for the embodiment shown in FIG. 8. The first network element is specifically an SMF, and the second network element is specifically a PCF. The first request message in the embodiment shown in FIG. 8 is specifically a policy create message, the first response message is specifically a policy create response message, the second request message is specifically a policy update notification message, and the second response message is specifically a policy update notification response message. The policy create message and the policy create response message are in one HTTP interaction procedure, and the policy update notification message and the policy update notification response message are in another HTTP interaction procedure.

The procedure includes the following steps.

Step 1101: The SMF sends a policy create message to the PCF. Correspondingly, the PCF may receive the policy create message.

The policy create message may be specifically an Npcf_SMPolicyControl_Create message, and is used to request to obtain a latest policy from the PCF.

Step 1102: The SMF waits for a policy create response message.

The policy create response message may be specifically an Npcf_SMFPolicyControl_Create Response message.

Step 1103: The PCF modifies a policy and requires that a PDU session be released.

It should be noted that in a correct time sequence, this step should be performed after the PCF sends the policy create response message, but because of an out-of-order problem, this step is performed first.

Step 1104: The PCF sends a policy update notification message to the SMF. Correspondingly, the SMF may receive the policy update notification message.

The policy update notification message may be specifically an Npcf_SMPolicyControl_UpdateNotify message.

In a correct time sequence, the policy update notification message should be sent after the PCF sends the policy create response message, but because messages are out of order, the policy update notification message is sent to the SMF before the policy create response message is sent.

After receiving the policy update notification message, the SMF determines that the SMF is currently in a policy update create message procedure, but the policy update notification message sent by the PCF requires that the PDU session be deleted, in other words, a priority of the policy update notification message is higher than that of the policy create response message. Therefore, the SMF needs to first process the policy update notification message.

Step 1105: The SMF processes the policy update notification message.

Specifically, the SMF deletes a session policy based on the policy update notification message.

Step 1106: The SMF sends a policy update notification response message to the PCF. Correspondingly, the PCF may receive the policy update notification response message.

The policy update notification response message may be specifically an Npcf_SMPolicyControl_UpdateNotify Response message.

The policy update notification response message is a response message for the policy update notification message.

Step 1107: The PCF sends the policy create response message to the SMF. Correspondingly, the SMF may receive the policy create response message.

The policy create response message may be specifically an Npcf_SMPolicyControl_Create Response message. Because the SMF is in a PDU session delete processing procedure, the SMF may discard the policy create response message.

Step 1108: The SMF discards the policy create response message.

Step 1109: After deleting the session policy, the SMF sends a policy delete message to the PCF. Correspondingly, the PCF may receive the policy delete message.

The policy delete message may be specifically an Npcf_SMPolicyControl_Delete message.

Step 1110: The PCF sends a policy delete response message to the SMF. Correspondingly, the SMF may receive the policy delete response message.

In the foregoing embodiment, because of the out-of-order problem, the SMF receives the policy update notification message before receiving the policy create response message. Because the priority of the policy update notification message is higher, the SMF first processes the policy update notification message, and discards the policy create response message after receiving the policy create response message. Therefore, orderly processing of messages between different HTTP connections is implemented.

Figure 12:
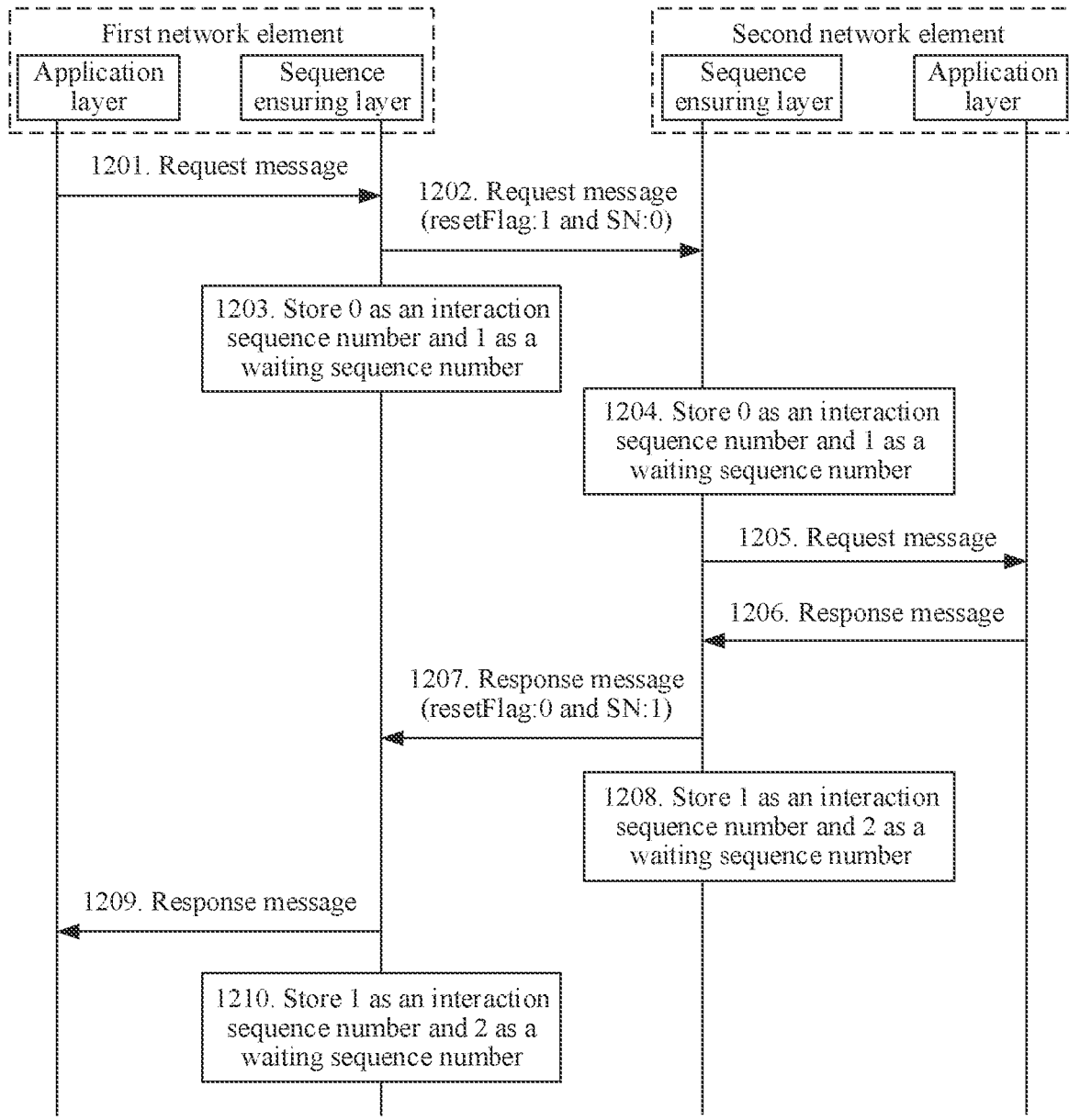
FIG. 12 is a schematic flowchart of a message processing method according to an embodiment of this application.
Figure 13A:
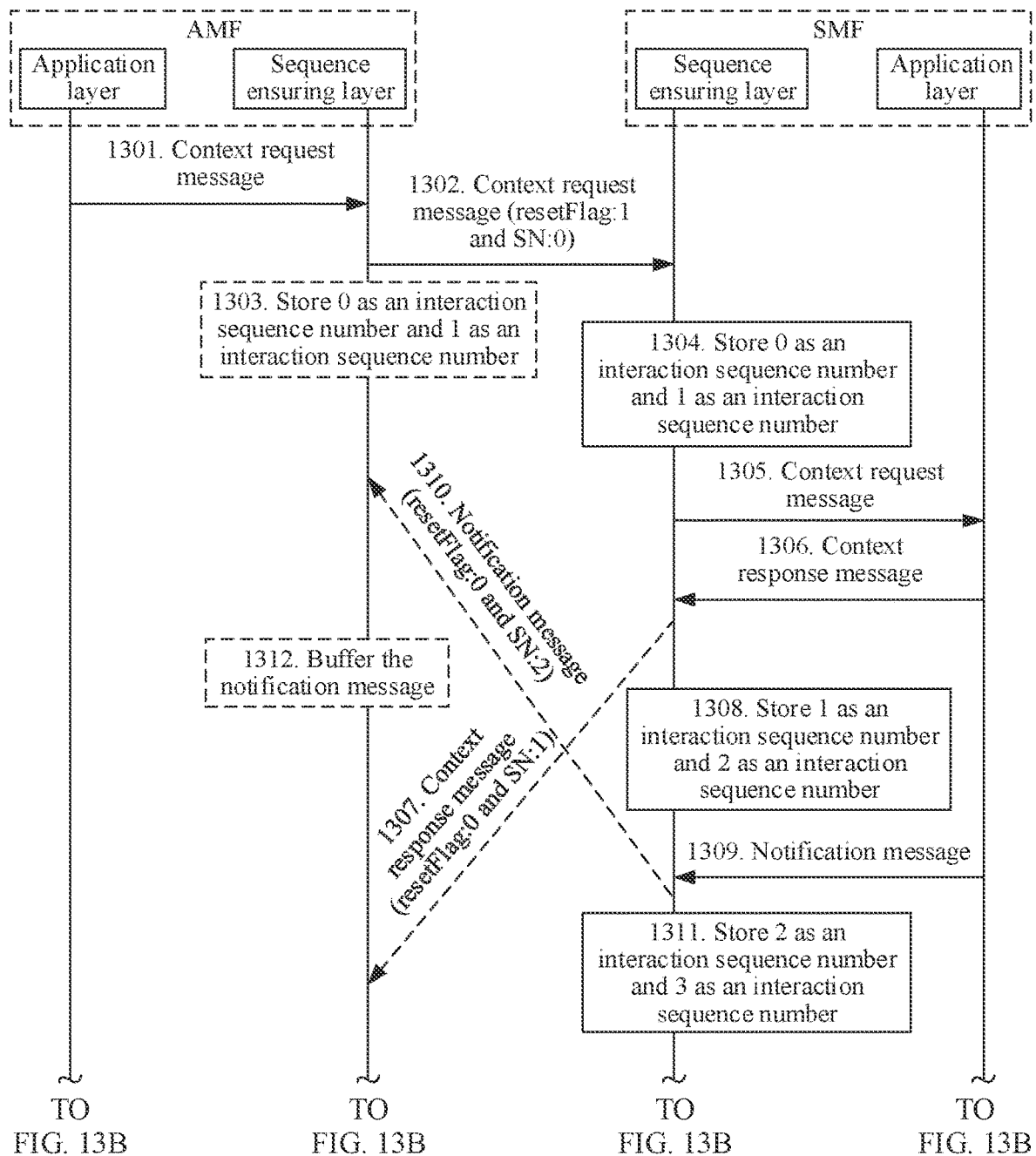
FIG. 13A and FIG. 13B are a schematic flowchart of PDU session establishment.
Figure 13B:
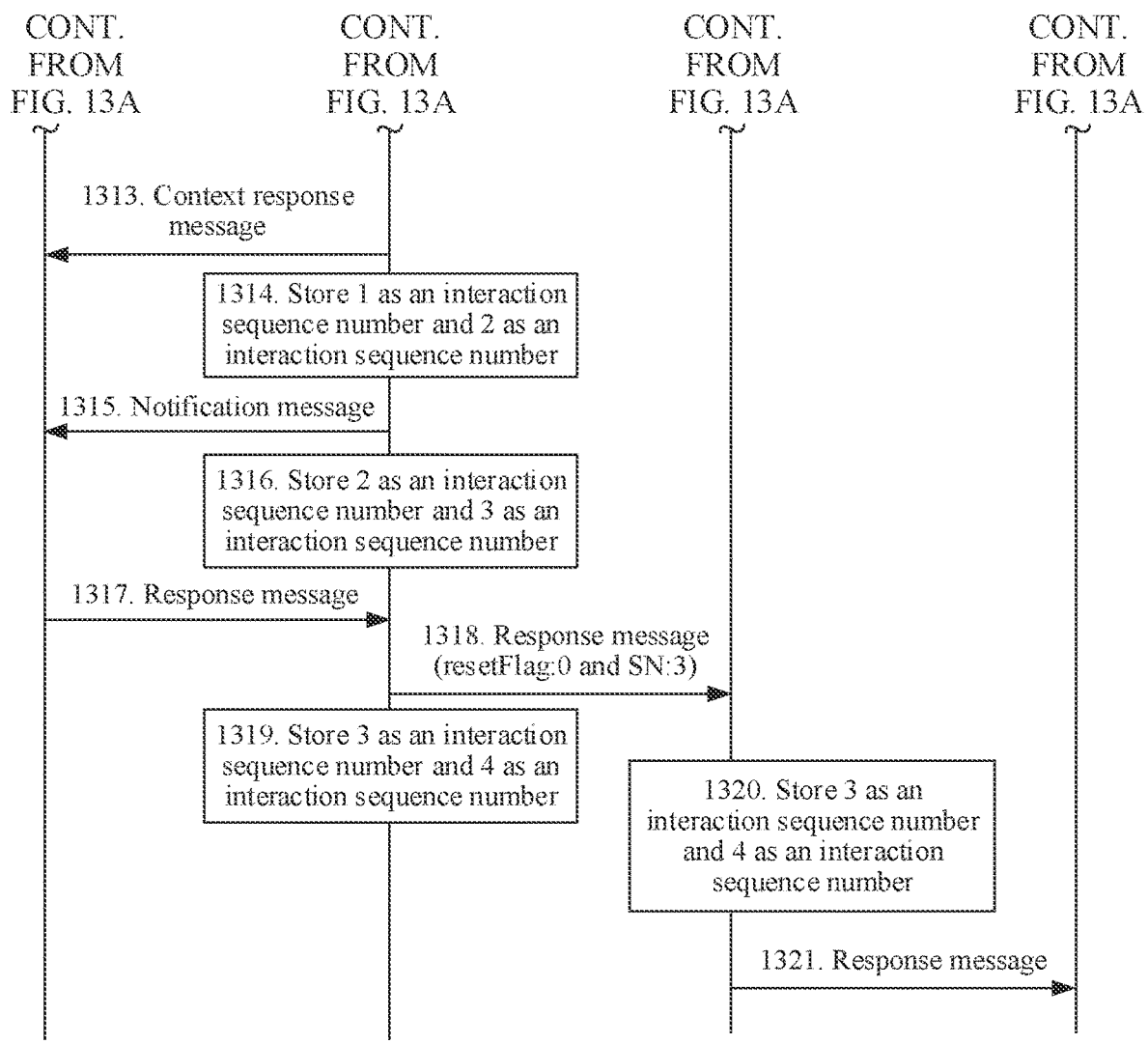

With reference to FIG. 12, FIG. 13A and FIG. 13B, the following specifically describes the second implementation in the system architecture shown in FIG. 1. A sequence ensuring layer is added to an NF network element.

FIG. 12 is a schematic flowchart of a message processing method according to this application. A first network element includes an application layer and a sequence ensuring layer, and a second network element includes an application layer and a sequence ensuring layer. A specified step is 1, messages are numbered from 0, first reset flag information is 0, and second reset flag information is 1.

The method includes the following steps.

Step 1201: The application layer of the first network element sends a request message to the sequence ensuring layer. Correspondingly, the sequence ensuring layer may receive the request message.

If the sequence ensuring layer determines that the message is an initial message exchanged between the first network element and the second network element, the sequence ensuring layer adds resetFlag:1 and SN:0 to the request message, where resetFlag represents reset information.

Step 1202: The sequence ensuring layer of the first network element sends the request message to the sequence ensuring layer of the second network element. Correspondingly, the sequence ensuring layer of the second network element may receive the request message.

The request message includes resetFlag: 1 and SN:0.

Step 1203: The sequence ensuring layer of the first network element stores 0 as an interaction sequence number and 1 as a waiting sequence number.

Step 1204: The sequence ensuring layer of the second network element stores 0 as an interaction sequence number and 1 as a waiting sequence number.

Step 1205: The sequence ensuring layer of the second network element sends a request message to the application layer. Correspondingly, the application layer may receive the request message.

It should be noted that the request message sent by the sequence ensuring layer of the second network element to the application layer may not include resetFlag: 1 and SN:0, or certainly, the sequence ensuring layer may send the complete request message to the application layer.

After receiving the request message, the application layer of the second network element processes the request message, and generates a response message after the processing ends.

Step 1206: The application layer of the second network element sends the response message to the sequence ensuring layer. Correspondingly, the sequence ensuring layer may receive the response message.

If the sequence ensuring layer determines that the message is not the initial message exchanged between the first network element and the second network element, the sequence ensuring layer adds resetFlag:0 and SN:1 to the response message.

Step 1207: The sequence ensuring layer of the second network element sends the response message to the sequence ensuring layer of the first network element. Correspondingly, the sequence ensuring layer of the first network element may receive the response message.

Step 1208: The sequence ensuring layer of the second network element stores 1 as an interaction sequence number and 2 as a waiting sequence number.

Step 1209: The sequence ensuring layer of the first network element sends a response message to the application layer. Correspondingly, the application layer may receive the response message.

After receiving the response message, the application layer of the first network element processes the response message. It should be noted that the response message may not include resetFlag: 0 and SN:1, or certainly, the sequence ensuring layer may send the complete response message to the application layer.

Step 1210: The sequence ensuring layer of the first network element stores 1 as an interaction sequence number and 2 as a waiting sequence number.

In the foregoing embodiment, a sequence ensuring layer is added to a network element, so that an application layer is shielded from a problem that messages are out of order, thereby implementing orderly message processing.

With reference to the application scenario in the system shown in FIG. 4, the following specifically describes the method shown in FIG. 12. FIG. 13A and FIG. 13B are a schematic flowchart of PDU session establishment. A first network element is specifically an AMF, the AMF includes an application layer and a sequence ensuring layer, a second network element is specifically an SMF, and the SMF includes an application layer and a sequence ensuring layer. A specified step is 1, messages are numbered from 0, first reset flag information is 0, and second reset flag information is 1.

The method includes the following steps.

Step 1301: The application layer of the AMF sends a context request message to the sequence ensuring layer. Correspondingly, the sequence ensuring layer may receive the context request message.

If the sequence ensuring layer determines that the context message is an initial message exchanged between the AMF and the SMF, the sequence ensuring layer adds resetFlag:1 and SN:0 to the context request message. The context request message is a create session management context request message, for example, may be specifically an Nsmf_PDUSession_CreateSMContext Request message.

Step 1302: The sequence ensuring layer of the AMF sends the context request message to the sequence ensuring layer of the SMF. Correspondingly, the sequence ensuring layer of the SMF may receive the context request message.

The context request message includes resetFlag: 1 and SN:0.

Step 1303: The sequence ensuring layer of the AMF stores 0 as an interaction sequence number and 1 as a waiting sequence number.

Step 1304: The sequence ensuring layer of the SMF stores 0 as an interaction sequence number and 1 as a waiting sequence number.

Step 1305: The sequence ensuring layer of the SMF sends the context request message to the application layer. Correspondingly, the application layer may receive the context request message.

After receiving the context request message, the application layer of the SMF processes the context request message, and generates a context response message after the processing ends.

The context response message is a create session management context response message, for example, may be specifically an Nsmf_PDUSession_CreateSMContext Response message.

Step 1306: The application layer of the SMF sends the context response message to the sequence ensuring layer. Correspondingly, the sequence ensuring layer may receive the context response message.

If the sequence ensuring layer determines that the context response message is not the initial message exchanged between the SMF and the SMF, the sequence ensuring layer adds resetFlag:0 and SN:1 to the context response message.

Step 1307: The sequence ensuring layer of the SMF sends the context response message to the sequence ensuring layer of the AMF.

Step 1308: The sequence ensuring layer of the SMF stores 1 as an interaction sequence number and 2 as a waiting sequence number.

Step 1309: The application layer of the SMF generates a notification message, and sends the notification message to the sequence ensuring layer.

The notification message may be specifically an Namf_Communication_N1N2MessageTransfer Request message.

Step 1310: The sequence ensuring layer of the SMF sends the notification message to the sequence ensuring layer of the AMF.

If the sequence ensuring layer determines that the notification message is not the initial message exchanged between the SMF and the SMF, the sequence ensuring layer adds resetFlag:0 and SN:2 to the notification message.

In a normal case, the AMF first receives the context response message in step 1307, and then receives the notification message in step 1310. However, because of an out-of-order problem, actually, the AMF first receives the notification message, and then receives the context response message.

Step 1311: The sequence ensuring layer of the SMF stores 2 as an interaction sequence number and 3 as a waiting sequence number.

Step 1312: The AMF buffers the notification message.

After receiving the notification message, the AMF obtains the sequence number 2 in the notification message, and the current waiting sequence number of the AMF is 1. Therefore, the AMF buffers the notification message and continues to wait for a next message until the context response message is received.

Step 1313: The sequence ensuring layer of the AMF sends the context response message to the application layer. Correspondingly, the application layer may receive the context response message.

Because the sequence number in the context response message is 1, and is the same as the current waiting sequence number of the AMF, the sequence ensuring layer of the AMF may send the context response message to the application layer for processing.

After receiving the context response message, the application layer may process the context response message.

Step 1314: The sequence ensuring layer of the AMF stores 1 as an interaction sequence number and 2 as a waiting sequence number.

Step 1315: The sequence ensuring layer of the AMF obtains the notification message from a buffer, and sends the notification message to the application layer. Correspondingly, the application layer may receive the notification message.

After processing the context response message, the sequence ensuring layer of the AMF updates the local interaction sequence number to 1 and the waiting sequence number to 2. Because the sequence number in the buffered notification message is 2, and is the same as the waiting sequence number of the AMF, the sequence ensuring layer of the AMF determines that the notification message can be currently processed, and then sends the notification message to the application layer.

After receiving the notification message, the application layer processes the notification message, and then generates a response message. The response message may be specifically an Namf_Communication_N1N2MessageTransfer Response message.

Step 1316: The sequence ensuring layer of the AMF stores 2 as an interaction sequence number and 3 as a waiting sequence number.

Step 1317: The application layer of the AMF sends the response message to the sequence ensuring layer. Correspondingly, the sequence ensuring layer may receive the response message.

Step 1318: The sequence ensuring layer of the AMF sends the response message to the sequence ensuring layer of the SMF. Correspondingly, the sequence ensuring layer of the SMF may receive the response message.

The response message includes resetFlag: 0 and SN: 3.

Step 1319: The sequence ensuring layer of the AMF stores 3 as an interaction sequence number and 4 as a waiting sequence number.

Step 1320: The sequence ensuring layer of the SMF stores 3 as an interaction sequence number and 4 as a waiting sequence number.

Step 1321: The sequence ensuring layer of the SMF sends the response message to the application layer. Correspondingly, the application layer may receive the response message.

After receiving the response message, the application layer of the SMF processes the response message.

In this embodiment, although the notification message in step 1310 arrives at the AMF before the context response message in step 1307, in other words, a problem that messages are out of order occurs, the AMF buffers the notification message, and processes the notification message after processing the context response message, so that orderly message processing is implemented.

The solutions provided in this application are mainly described above from a perspective of interaction between network elements. It may be understood that, to implement the foregoing functions, each network element includes a corresponding hardware structure and/or software module for implementing each function. A person of ordinary skill in the art should easily be aware that, in combination with the examples described in the embodiments disclosed in this specification, units and algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 14:
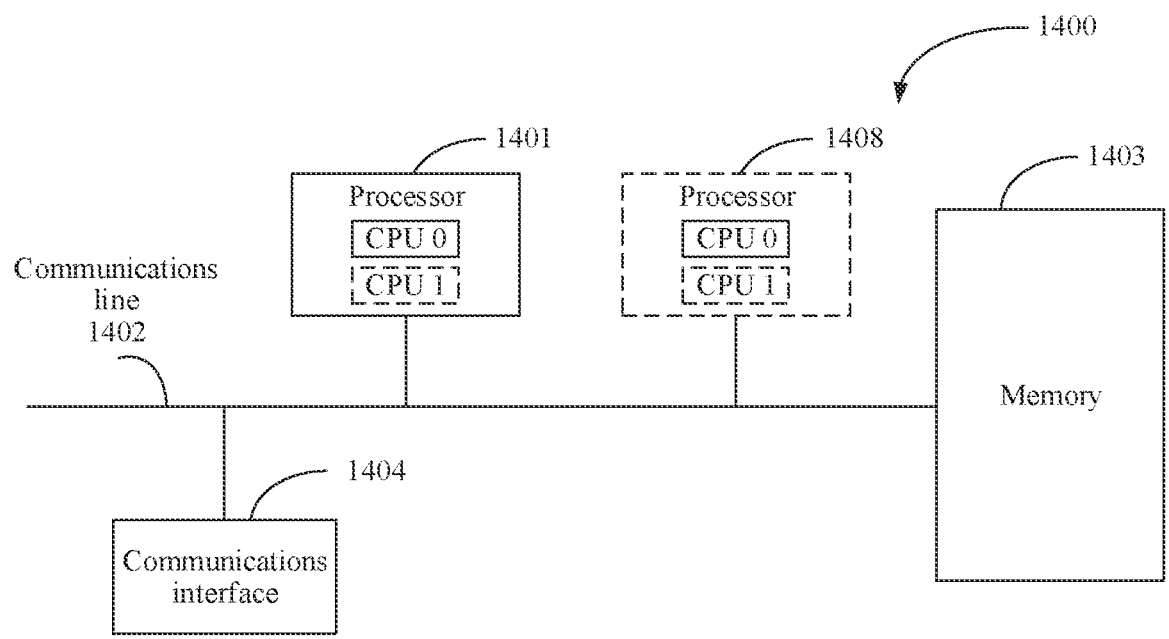
FIG. 14 is a schematic diagram of an apparatus according to an embodiment of this application.

Based on a same inventive concept, FIG. 14 is a schematic diagram of an apparatus according to this application. The apparatus may be an NF network element (for example, the first network element in the foregoing embodiments) or a chip, and may perform the method performed by the first network element in any one of the foregoing embodiments.

The apparatus 1400 includes at least one processor 1401, a communications line 1402, a memory 1403, and at least one communications interface 1404.

The processor 1401 may be a general-purpose central processing unit (CPU), a microprocessor, an application-specific integrated circuit (ASIC), or one or more integrated circuits for controlling program execution of the solutions of this application.

The communications line 1402 may include a channel transmitting information between the foregoing components.

The communications interface 1404 is any apparatus like a transceiver, and is configured to communicate with another device or a communications network such as the Ethernet, a radio access network (RAN), a wireless local area network (WLAN), or a wired access network.

The memory 1403 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray optical disc, and the like), a magnetic disk storage medium or another magnetic storage device, or any other medium capable of carrying or storing expected program code in a form of instructions or data structures and capable of being accessed by a computer, but is not limited thereto. The memory may exist independently and is connected to the processor by using the communications line 1402. The memory may be alternatively integrated with the processor.

The memory 1403 is configured to store a computer executable instruction for executing the solutions of this application, and execution of the computer executable instruction is controlled by the processor 1401. The processor 1401 is configured to execute a computer executable instruction stored in the memory 1403, to implement the message processing method provided in the foregoing embodiments of this application.

Optionally, the computer executable instruction in this embodiment of this application may also be referred to as application program code. This is not specifically limited in this embodiment of this application.

In specific implementation, in an embodiment, the processor 1401 may include one or more CPUs such as a CPU 0 and a CPU 1 in FIG. 14.

In specific implementation, in an embodiment, the apparatus 1400 may include a plurality of processors, for example, the processor 1401 and a processor 1408 in FIG. 14. Each of the processors may be a single-CPU processor, or may be a multi-CPU processor. The processor herein may be one or more devices, circuits, and/or processing cores used to process data (for example, a computer program instruction).

When the apparatus shown in FIG. 14 is a chip, for example, may be a chip in an NF network element, the chip includes the processor 1401 (and may further include the processor 1408), the communications line 1402, the memory 1403, and the communications interface 1404. Specifically, the communications interface 1404 may be an input interface, a pin, a circuit, or the like. The memory 1403 may be a register, a buffer, or the like. The processor 1401 and the processor 1408 each may be a general-purpose CPU, a microprocessor, an ASIC, or one or more integrated circuits configured to control program execution of the message processing method in any one of the foregoing embodiments.

Figure 15:
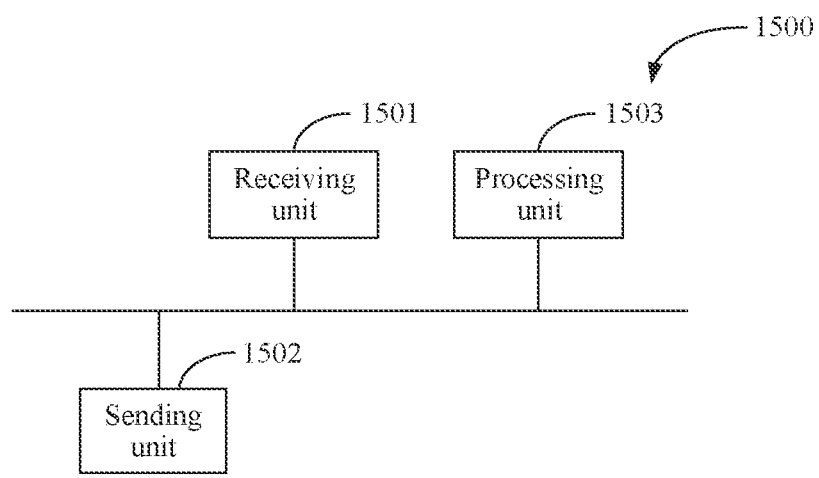
FIG. 15 is a schematic diagram of another apparatus according to an embodiment of this application.

In this application, function modules in the apparatus may be obtained through division based on the foregoing method examples. For example, function modules may be obtained through division based on corresponding functions, or two or more functions may be integrated into one processing module. The integrated module may be implemented in a form of hardware, or may be implemented in a form of a software functional module. It should be noted that, in this application, module division is an example, and is merely logical function division. In actual implementation, another division manner may be used. For example, when function modules are obtained through division based on corresponding functions, FIG. 15 is a schematic diagram of an apparatus. The apparatus 1500 may be the first network element or a chip in the first network element involved in the foregoing embodiments. The apparatus 1500 includes a receiving unit 1501, a sending unit 1502, and a processing unit 1503.

In an implementation, the apparatus 1500 may implement the following operations:

The sending unit is configured to send a first request message to a second network element. The first request message belongs to a first HTTP interaction procedure. The receiving unit is configured to: before receiving a first response message for the first request message, receive a second request message from the second network element. The first response message belongs to the first HTTP interaction procedure, and the second request message belongs to a second HTTP interaction procedure. The processing unit is configured to perform an operation on the second request message based on a relationship between the first HTTP interaction procedure and the second HTTP interaction procedure.

In a possible implementation, the processing unit is specifically configured to: if it is determined that the first HTTP interaction procedure and the second HTTP interaction procedure are independent of each other, process the second request message.

In a possible implementation, the sending unit is further configured to send a second response message for the second request message to the second network element; and after the sending unit sends the second response message, the receiving unit is further configured to receive the first response message from the second network element, and the processing unit is further configured to process the first response message; or the receiving unit is further configured to receive the first response message from the second network element; the processing unit is further configured to process the first response message; and after the processing unit processes the first response message, the sending unit is further configured to send a second response message for the second request message to the second network element.

The second response message belongs to the second HTTP interaction procedure.

In a possible implementation, the processing unit is specifically configured to: if it is determined that the second HTTP interaction procedure depends on the first HTTP interaction procedure and the second request message cannot be rejected, buffer the second request message;

the receiving unit is further configured to receive the first response message; and the processing unit is further configured to: process the first response message, and process the second request message after processing the first response message.

In a possible implementation, after the processing unit processes the second request message, the sending unit is further configured to send a second response message for the second request message to the second network element, where the second response message belongs to the second HTTP interaction procedure.

In a possible implementation, the processing unit is specifically configured to: if it is determined that the second HTTP interaction procedure depends on the first HTTP interaction procedure and the second request message can be rejected, notify the sending unit to send a reject message to the second network element.

In a possible implementation, the reject message includes specified duration, the specified duration is used to indicate the second network element to re-initiate a request message after the specified duration, and after the sending unit sends the reject message to the second network element, the receiving unit is further configured to receive the first response message from the second network element; and the processing unit is further configured to process the first response message.

In a possible implementation, after the sending unit sends the reject message to the second network element, the receiving unit is further configured to receive the first response message from the second network element;

the processing unit is further configured to process the first response message; and after the processing unit processes the first response message, the sending unit is further configured to send a resending request message to the second network element, where the resending request message is used to trigger the second network element to re-initiate a request message for the second request message.

In a possible implementation, the processing unit is specifically configured to: if it is determined that a priority of the second HTTP interaction procedure is higher than that of the first HTTP interaction procedure, process the second request message.

In a possible implementation, after the processing unit processes the second request message, the receiving unit is further configured to receive the first response message from the second network element; and the processing unit is further configured to discard the first response message.

It should be understood that the apparatus 1500 may be configured to implement steps performed by the first network element in the methods in the embodiments of the present invention. For related features, refer to the foregoing description. Details are not described herein again.

If the apparatus is a first network element, the first network element is presented by obtaining function modules through division in an integrated manner. The "module" herein may be a specific ASIC, a circuit, a processor for executing one or more software or firmware programs, a memory, an integrated logic circuit, and/or another component that can provide the foregoing functions. In a simple embodiment, a person skilled in the art may figure out that the first network element may be in the form shown in FIG. 15.

For example, the processor 1401 in FIG. 14 may invoke the computer executable instruction stored in the memory 1403, so that the first network element performs the methods in the foregoing method embodiments.

Specifically, functions/implementation processes of the receiving unit 1501, the processing unit 1503, and the sending unit 1502 in FIG. 15 may be implemented by the processor 1401 in FIG. 14 by invoking the computer executable instruction stored in the memory 1403. Alternatively, functions or implementation processes of the processing unit 603 in FIG. 15 may be implemented by the processor 1401 in FIG. 14 by invoking the computer executable instruction stored in the memory 1403, and functions or implementation processes of the receiving unit 1501 and the sending unit 1502 may be implemented by the communications interface 1404 in FIG. 14.

Optionally, when the apparatus 1500 is a chip or a circuit, functions/implementation processes of the receiving unit 1501 and the sending unit 1502 may be implemented by using a pin, a circuit, or the like. Optionally, when the apparatus 1500 is a chip, the memory 1503 may be a storage unit, such as a register or a buffer, in the chip.

Certainly, when the apparatus 1500 is a first network element, the memory 1503 may be a storage unit that is in the first network element and that is located outside a chip. This is not specifically limited in this embodiment of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of the present invention are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may be any conventional processor, controller, microcontroller, or state machine. The processor may be alternatively implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the aft. For example, the storage medium may be connected to a processor so that the processor may read information from the storage medium and write information to the storage medium. Optionally, the storage medium may be integrated into a processor. The processor and the storage medium may be disposed in an ASIC, and the ASIC may be disposed in a terminal device. Optionally, the processor and the storage medium may be disposed in different components of a terminal device.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present disclosure is described with reference to specific features and the embodiments thereof, it is clear that various modifications and combinations may be made to them without departing from the spirit and scope of the present disclosure. Correspondingly, the specification and accompanying drawings are merely example description of the present disclosure defined by the accompanying claims, and are considered as any of or all modifications, variations, combinations or equivalents that cover the scope of the present disclosure. It is clearly that a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method comprising:
sending, by a first network element, a first request message to a second network element, wherein the first request message belongs to a first hypertext transfer protocol (HTTP) interaction procedure;
before receiving a first response message for the first request message, receiving, by the first network element, a second request message from the second network element, wherein the first response message belongs to the first HTTP interaction procedure, and the second request message belongs to a second HTTP interaction procedure; and
performing, by the first network element, an operation on the second request message based on whether the second HTTP interaction procedure is dependent on the first HTTP interaction procedure and whether the second request message is rejectable by the first network element, or based on priorities of the first HTTP interaction procedure and the second HTTP interaction procedure.

2. The method according to claim 1, wherein performing, by the first network element, the operation on the second request message comprises:
when determining, by the first network element, that the first HTTP interaction procedure and the second HTTP interaction procedure are independent of each other, processing, by the first network element, the second request message.

3. The method according to claim 2, wherein after processing, by the first network element, the second request message, the method further comprises:
sending, by the first network element, a second response message for the second request message to the second network element; and after sending the second response message, receiving the first response message from the second network element and processing the first response message; or
receiving, by the first network element, the first response message from the second network element, and processing the first response message; and after processing the first response message, sending the second response message for the second request message to the second network element, wherein
the second response message belongs to the second HTTP interaction procedure.

4. The method according to claim 1, wherein performing, by the first network element, the operation on the second request message comprises:
when determining, by the first network element, that the second HTTP interaction procedure depends on the first HTTP interaction procedure and the second request message is not rejectable by the first network element, buffering, by the first network element, the second request message; and
after receiving and processing the first response message, processing, by the first network element, the second request message.

5. The method according to claim 4, wherein after processing, by the first network element, the second request message, the method further comprises:
sending, by the first network element, a second response message for the second request message to the second network element, wherein the second response message belongs to the second HTTP interaction procedure.

6. The method according to claim 1, wherein performing, by the first network element, the operation on the second request message comprises:
when determining, by the first network element, that the second HTTP interaction procedure depends on the first HTTP interaction procedure and the second request message is rejectable, sending, by the first network element, a reject message to the second network element.

7. The method according to claim 6, wherein the reject message comprises a specified duration, the reject message instructing the second network element to re-initiate a request message after the specified duration, and after sending, by the first network element, the reject message to the second network element, the method further comprises:
receiving, by the first network element, the first response message from the second network element, and processing, by the first network element, the first response message.

8. The method according to claim 6, wherein after sending, by the first network element, the reject message to the second network element, the method further comprises:
receiving, by the first network element, the first response message from the second network element, and processing, by the first network element, the first response message; and
after processing the first response message, sending, by the first network element, a resending request message to the second network element, the resending request message triggering the second network element to re-initiate a request message for the second request message in the second HTTP interaction procedure.

9. The method according to claim 1, wherein performing, by the first network element, the operation on the second request message comprises:
when determining, by the first network element, that a priority of the second HTTP interaction procedure is higher than that of the first HTTP interaction procedure, processing, by the first network element, the second request message.

10. The method according to claim 9, wherein after processing, by the first network element, the second request message, the method further comprises:
receiving, by the first network element, the first response message from the second network element; and
discarding, by the first network element, the first response message.

11. A method comprising:
sending, by a first network element, a first message to a second network element, wherein the first message comprises reset flag information and a sequence number;
using, by the first network element, the sequence number in the first message as a first interaction sequence number of the first network element, and increasing the first interaction sequence number of the first network element by a specified step to obtain a first waiting sequence number of the first network element;
receiving, by the second network element, the first message from the first network element; and when the reset flag information is first reset flag information, and the sequence number in the first message is the same as a waiting sequence number of the second network element, processing, by the second network element, the first message using the sequence number in the first message as a second interaction sequence number of the second network element, and increasing the second interaction sequence number of the second network element by the specified step to obtain a second waiting sequence number of the second network element; and wherein the first interaction sequence number of the first network element indicates a sequence number of a message currently exchanged between the first network element and the second network element, the first waiting sequence number of the first network element indicates a sequence number of a next message for which the first network element is currently waiting, the second interaction sequence number of the second network element indicates the sequence number of the message currently exchanged between the second network element and the first network element, and the second waiting sequence number of the second network element indicates a sequence number of a next message for which the second network element is currently waiting.

12. The method according to claim 11, wherein the method further comprises:
when the reset flag information is the first reset flag information, and the sequence number in the first message is different from the waiting sequence number of the second network element, buffering, by the second network element, the first message.

13. The method according to claim 11, wherein the method further comprises:
when the reset flag information is second reset flag information, processing, by the second network element, the first message; and
using, by the second network element, the sequence number in the first message as the second interaction sequence number of the second network element, and increasing the second interaction sequence number of the second network element by the specified step to obtain the second waiting sequence number of the second network element.

14. The method according to claim 11, wherein the method further comprises:
sending, by the second network element, a second message to the first network element, wherein the second message comprises the first reset flag information and a second sequence number, and the sequence number in the second message is a sum of a current interaction sequence number of the second network element and the specified step;
using, by the second network element, the second sequence number in the second message as a third interaction sequence number of the second network element, and increasing the third interaction sequence number of the second network element by the specified step to obtain a third waiting sequence number of the second network element;
receiving, by the first network element, the second message from the second network element; and
when the second sequence number in the second message is the same as a waiting sequence number of the first network element, processing, by the first network element, the second message, using the sequence number in the second message as a fourth interaction sequence number of the first network element, and increasing the fourth interaction sequence number of the first network element by the specified step to obtain a fourth waiting sequence number of the first network element; or when the second sequence number in the second message is different from the waiting sequence number of the first network element, buffering, by the first network element, the second message.

15. An apparatus, comprising:
a non-transitory memory storage comprising instructions; and
one or more processors in communication with the memory storage, wherein the instructions, when executed by the one or more processors, cause the apparatus to:
send a first request message to a second network element, wherein the first request message belongs to a first hypertext transfer protocol (HTTP) interaction procedure;
before receiving a first response message for the first request message, receive a second request message from the second network element, wherein the first response message belongs to the first HTTP interaction procedure, and the second request message belongs to a second HTTP interaction procedure; and
perform an operation on the second request message based on whether the second HTTP interaction procedure is dependent on the first HTTP interaction procedure and whether the second request message is rejectable by the apparatus, or based on priorities of the first HTTP interaction procedure and the second HTTP interaction procedure.

16. The apparatus according to claim 15, wherein the instructions, when executed by the one or more processors, cause the apparatus further to: when determining that the first HTTP interaction procedure and the second HTTP interaction procedure are independent of each other, process the second request message.

17. The apparatus according to claim 16, wherein the instructions, when executed by the one or more processors, cause the apparatus further to:
send a second response message for the second request message to the second network element; and after sending the second response message, receive the first response message from the second network element, and process the first response message; or
receive the first response message from the second network element; process the first response message; and after processing the first response message, send the second response message for the second request message to the second network element, wherein
the second response message belongs to the second HTTP interaction procedure.

18. The apparatus according to claim 15, wherein the instructions, when executed by the one or more processors, cause the apparatus further to:
when determining that the second HTTP interaction procedure depends on the first HTTP interaction procedure and the second request message is not rejectable, buffer the second request message;
receive the first response message; and
process the first response message, and process the second request message after processing the first response message.

19. The apparatus according to claim 15, wherein the instructions, when executed by the one or more processors, cause the apparatus further to:
    when determining that the second HTTP interaction procedure depends on the first HTTP interaction procedure and the second request message is rejectable, send a reject message to the second network element.

20. The apparatus according to claim 15, wherein performing the operation on the second request message comprises: when a priority of the second HTTP interaction procedure is higher than that of the first HTTP interaction procedure, processing the second request message.

\* \* \* \* \*